United States Patent
Yokoyama

(10) Patent No.: US 9,577,739 B2
(45) Date of Patent: Feb. 21, 2017

(54) COMMUNICATION DEVICES, MOBILE TERMINAL, IN A COOPERATIVE COMMUNICATION SYSTEM

(75) Inventor: Hitoshi Yokoyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 672 days.

(21) Appl. No.: 13/354,742

(22) Filed: Jan. 20, 2012

(65) Prior Publication Data

US 2012/0122391 A1 May 17, 2012

Related U.S. Application Data

(63) Continuation of application No. PCT/JP2009/064420, filed on Aug. 18, 2009.

(51) Int. Cl.
*H04B 3/36* (2006.01)
*H04B 7/14* (2006.01)
(Continued)

(52) U.S. Cl.
CPC ....... *H04B 7/15557* (2013.01); *H04B 7/15592* (2013.01); *H04W 16/26* (2013.01); *H04W 84/20* (2013.01); *H04W 88/04* (2013.01)

(58) Field of Classification Search
CPC .......... H04B 7/15557; H04B 7/15592; H04W 16/26; H04W 84/20; H04W 88/04; H04W 52/40
(Continued)

(56) References Cited

U.S. PATENT DOCUMENTS

2008/0045147 A1 2/2008 Okuda
2008/0207117 A1 8/2008 Lim et al.
(Continued)

FOREIGN PATENT DOCUMENTS

JP 2002-186056 6/2002
JP 2002-190770 7/2002
(Continued)

OTHER PUBLICATIONS

J. Nicholas Laneman; "Cooperative Diversity in Wireless Networks: Algorithms and Architectures"; Massachusetts Institute of Technology, Sep. 2002.
(Continued)

*Primary Examiner* — Ankur Jain
(74) *Attorney, Agent, or Firm* — Myers Wolin, LLC

(57) ABSTRACT

A communication device that is capable of communicating with a mobile terminal in cooperation with another communication device, and is capable of communicating with the mobile terminal via the other communication device. This communication device characteristically includes: a mode selecting unit configured to select one of a cooperative communication mode and a relayed communication mode, the cooperative communication mode being for transmitting notification information to the mobile terminal, the notification information being for causing the other communication device to perform a cooperative communication, the relayed communication mode being for causing the other communication device to relay notification information to the mobile terminal; and a mode information transmitting unit configured to transmit mode information to the other communication device, the mode information indicating a result from the mode selecting unit.

13 Claims, 38 Drawing Sheets

(51) Int. Cl.
*H04B 7/155* (2006.01)
*H04W 16/26* (2009.01)
*H04W 84/20* (2009.01)
*H04W 88/04* (2009.01)

(58) Field of Classification Search
USPC .......................................................... 455/7
See application file for complete search history.

(56) References Cited

U.S. PATENT DOCUMENTS

| | | | |
|---|---|---|---|
| 2008/0274692 A1 | 11/2008 | Larsson | |
| 2009/0135944 A1* | 5/2009 | Dyer et al. | 375/267 |
| 2009/0233544 A1* | 9/2009 | Oyman et al. | 455/7 |
| 2009/0270028 A1* | 10/2009 | Khojastepour et al. | 455/24 |
| 2010/0097969 A1* | 4/2010 | De Kimpe et al. | 370/311 |
| 2011/0038436 A1* | 2/2011 | Kim et al. | 375/260 |

FOREIGN PATENT DOCUMENTS

| | | |
|---|---|---|
| JP | 2008-028561 | 2/2008 |
| JP | 2008-48202 | 2/2008 |
| JP | 2009-517918 | 4/2009 |

OTHER PUBLICATIONS

International Search Report issued for corresponding International Patent Application No. PCT/JP2009/064420, mailed Nov. 24, 2009. English translation attached.

Fujitsu, "Discussion on DL coordinated multipoint transmission", 3GPP TSG-RAN1 Meeting #54, R1-083115, Jeju, Korea, Aug. 18-22, 2008.

Extended European search report with the supplementary European search report and the European search opinion issued for corresponding European Patent Application No. 09848467.8 dated Jul. 24, 2015.

* cited by examiner

COMMUNICATION DEVICES, MOBILE TERMINAL, IN A COOPERATIVE COMMUNICATION SYSTEM

CROSS-REFERENCE TO RELATED APPLICATION

This application is a continuation application of PCT/JP2009/064420 filed Aug. 18, 2009, the entire contents of which are hereby wholly incorporated by reference.

FIELD

A certain aspect of the present invention is related to communication devices, a mobile terminal, and a communication system.

BACKGROUND

As a communication system in which mobile terminals and base stations perform wireless communications, a communication system using relay stations has been suggested. In such a system, base stations communicate with mobile terminals via relay stations. Accordingly, communications can be performed with mobile terminals the radio waves from the base stations cannot reach. That is, the communication areas of the base stations can be made wider. Also, as base stations and relay stations cooperate to communicate with mobile terminals, the communication rate with mobile terminals can be made higher (Non-Patent Document 1, for example).

Non-Patent Document 1: J. N. Laneman, "Cooperative Diversity in Wireless Networks: Algorithms and Architectures," Ph. D. Thesis, Massachusetts Institute of Technology, Cambridge, Mass., Aug. 2002

SUMMARY

For example, there is used a communication device that is capable of communicating with a mobile terminal in cooperation with another communication device, and is capable of communicating with the mobile terminal via the another communication device, the communication device comprising: a mode selecting unit configured to select one of a cooperative communication mode and a relayed communication mode, the cooperative communication mode being for transmitting notification information to the mobile terminal, the notification information being for causing the another communication device to perform a cooperative communication, the relayed communication mode being for causing the another communication device to relay notification information to the mobile terminal; and a mode information transmitting unit configured to transmit mode information to the another communication device, the mode information indicating a result from the mode selecting unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DETAILED DESCRIPTION

The following is a description of embodiments, with reference to the accompanying drawings.

Embodiment 1

Figure 1A:
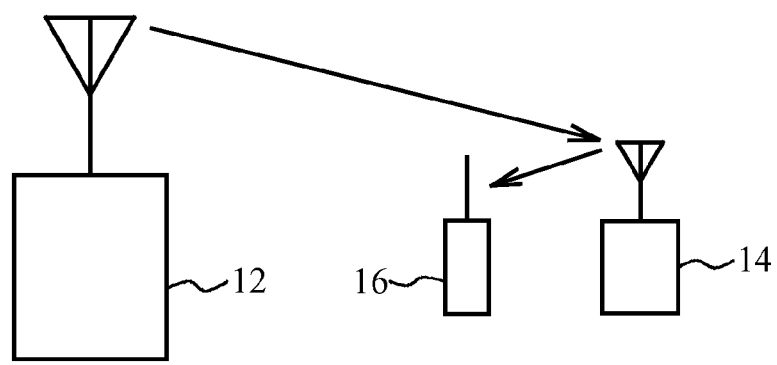
FIGS. 1A and 1B are diagrams showing examples of communication modes of a communication system according to Embodiment 1.
Figure 1B:
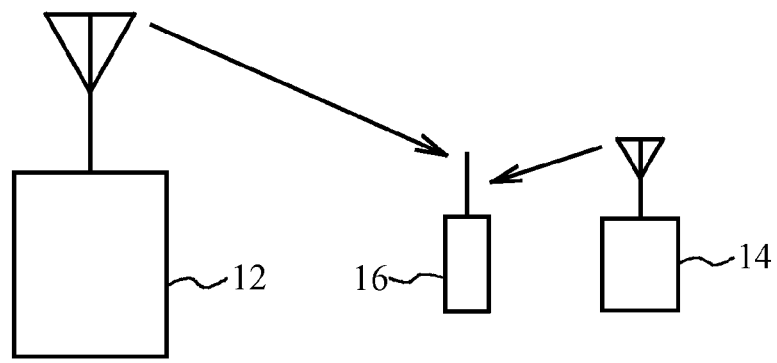

FIG. 1A and FIG. 1B are diagrams showing examples of communication modes of a communication system according to Embodiment 1. In the "cooperation method" illustrated in FIG. 1A, a base station 12 performs communications with a mobile terminal 16 via a relay station 14. For example, the relay station 14 transmits data received from the base station 12 to the mobile terminal 16. The communication mode according to this cooperation method will be hereinafter referred to as the "relayed communication mode." In the relayed communication mode, the base station 12 and the mobile terminal 16 can communicate with each other even if the mobile terminal 16 is located outside the area of the base station 12, as long as the mobile terminal 16 is located within the area of the relay station 14. Accordingly, it is possible to widen the communication range.

In the cooperation method illustrated in FIG. 1B, the mobile terminal 16 is located in the areas of both the base station 12 and the relay station 14. The base station 12 and the relay station 14 cooperate with each other to communicate with the mobile terminal 16. For example, the base station 12 and the relay station 14 transmit data to the mobile terminal 16. The communication mode according to this cooperation method will be hereinafter referred to as the "cooperative communication mode." In the cooperative communication mode, the base station 12 and the relay station 14 can communicate with the mobile terminal 16 in parallel, and accordingly, the communication rate can be improved. In this embodiment, a "sleep mode" is also used as a communication mode to suspend the relay station 14.

Using a notification channel such as a BCH (Broadcast Channel), the base station 12 transmits notification information to the mobile terminal 16, without specifying a destination. The notification information contains the information about the antennas of communication nodes such as the base station 12 and the relay station 14, the information for specifying the channel to be shared among mobile terminals, and the information about a communication format. Receiving the notification information, the mobile terminal 16 recognizes the timing to transmit a RACH (Random Access Channel) for synchronization with UL (UpLink), and stands by for communications with communication nodes.

Therefore, in the relayed communication mode illustrated in FIG. 1A, the relay station 14 transmits the notification information transmitted by the base station 12, to the mobile terminal 16 as it is. In the cooperative communication mode illustrated in FIG. 1B, on the other hand, the base station 12 transmits the notification information to the mobile terminal 16. Further, the base station 12 allows the relay station 14 to use a notification channel to transmit specific notification information to the mobile terminal 16. With this arrangement, the relay station 14 can transmit specific notification information to the mobile terminal 16. Being able to obtain the relay station antenna information from the notification information, the mobile terminal 16 can improve wireless communication quality. Also, the base station 12 and the relay station 14 transmit the same data signal to the mobile terminal 16 in adjusted timings. Accordingly, a transmission diversity effect is achieved, and the communication quality can be improved. In the sleep mode, the relay station 14 does not transmit any notification information, and does not connect to the mobile terminal 16.

Figure 2:
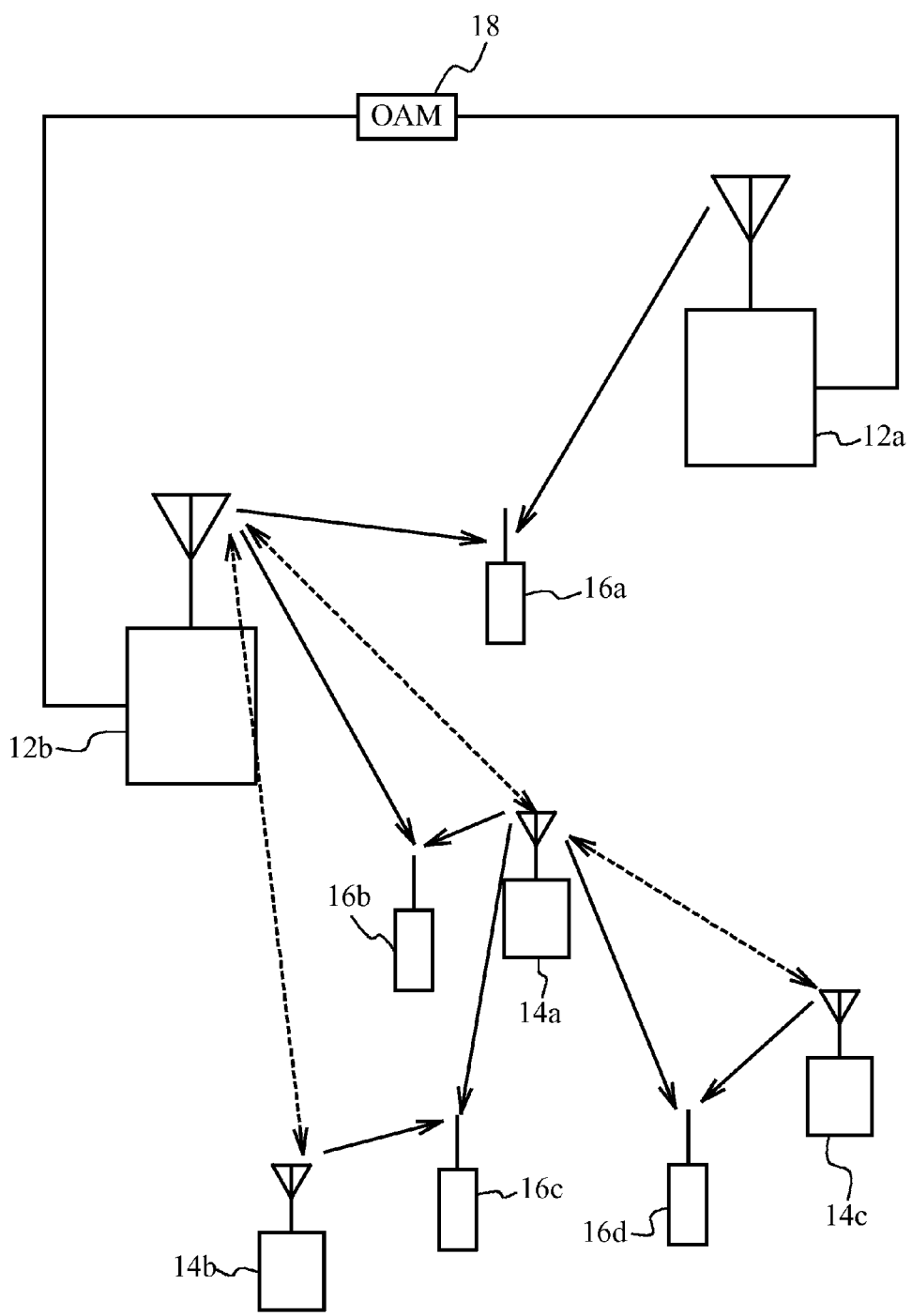
FIG. 2 is a diagram showing an example of cooperation among communication nodes.

FIG. 2 illustrates an example of cooperation among communication nodes. As shown in FIG. 2, a communication system includes base stations 12a and 12b, relay stations 14a through 14c, mobile terminals 16a through 16d, and an OAM (Operation Administration Maintenance) device 18 (a communication node control device). The arrows with solid lines indicate data communications from the base stations 12a and 12b and the relay stations 14a through 14c to the mobile terminals 16a through 16d. The arrows with dashed lines indicate data transfers between the base station 12b and the relay stations 14a and 14b, and data transfers between the relay station 14a and the relay station 14c. Data transfers can be performed through wired or wireless transfers. The data transfers between the base stations 12a and 12b and the OAM device 18 are performed mainly through wired transfers. The traffic information from the respective relay stations 14a through 14c and the base stations 12a and 12b are aggregated into the OAM device 18.

Since the base stations 12a and 12b and the relay stations 14a through 14c are nodes to communicate with the mobile terminals 16, those stations are also collectively called communication node devices. The communication node devices are also called communication devices. The mobile terminals 16 to receive data communications from communication node devices are classified into the following four types. The first type is those like the mobile terminal 16a for which the base stations 12a and 12b cooperate with each other. The second type is those like the mobile terminal 16b for which the base station 12b and the relay station 14a cooperate with each other. The third type is those like the mobile terminal 16c for which the relay stations 14a and 14b relaying information once from the base station 12b cooperate with each other. The fourth type is those like the mobile terminal 16d for which the relay station 14c relaying information twice or more and the relay station 14a cooperate with each other.

Figure 10A:
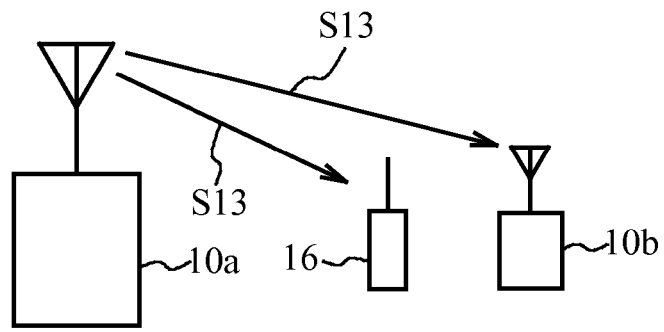
FIGS. 10A through 10D are diagrams illustrating the flow shown in FIG. 9.

As described above, any of the base stations 12 and the relay stations 14 can perform cooperative communications with a mobile terminal 16. Therefore, in the following description of cooperative communications, communication node devices 10 will be mainly described, rather than the base stations 12 and the relay stations 14. In a case where two or more communication node devices 10 perform cooperative communications with the mobile terminals 16, as shown in FIG. 10A, the communication node devices 10 are classified into master communication node devices 10a and slave communication node devices 10b. A master communication node devices 10a transmits mode information indicative of whether the communication mode is the cooperative communication mode or the relayed communication mode, to a slave communication node device 10b. The slave communication node device 10b conforms to the mode information. In this manner, the master communication node devices 10a can control the notification information generated from the slave communication node devices 10b. In a case where a base station 12 and a relay station 14 cooperate with each other, the base station 12 is a master communication node device 10a, and the relay station 14 is a slave communication node device 10b.

As described above, a master communication node device 10a can communicate with a mobile terminal 16 by cooperating with a slave communication node device 10b (another communication node device). Also, a master communication node device 10a can communicate with a mobile terminal 16 via a slave communication node device 10b. A slave communication node device 10b can communicate with a mobile terminal 16 by cooperating with a master communication node device 10a (another communication node device). Also, a slave communication node device 10b can relay communications between a master communication node device 10a and a mobile terminal 16.

Figure 3:
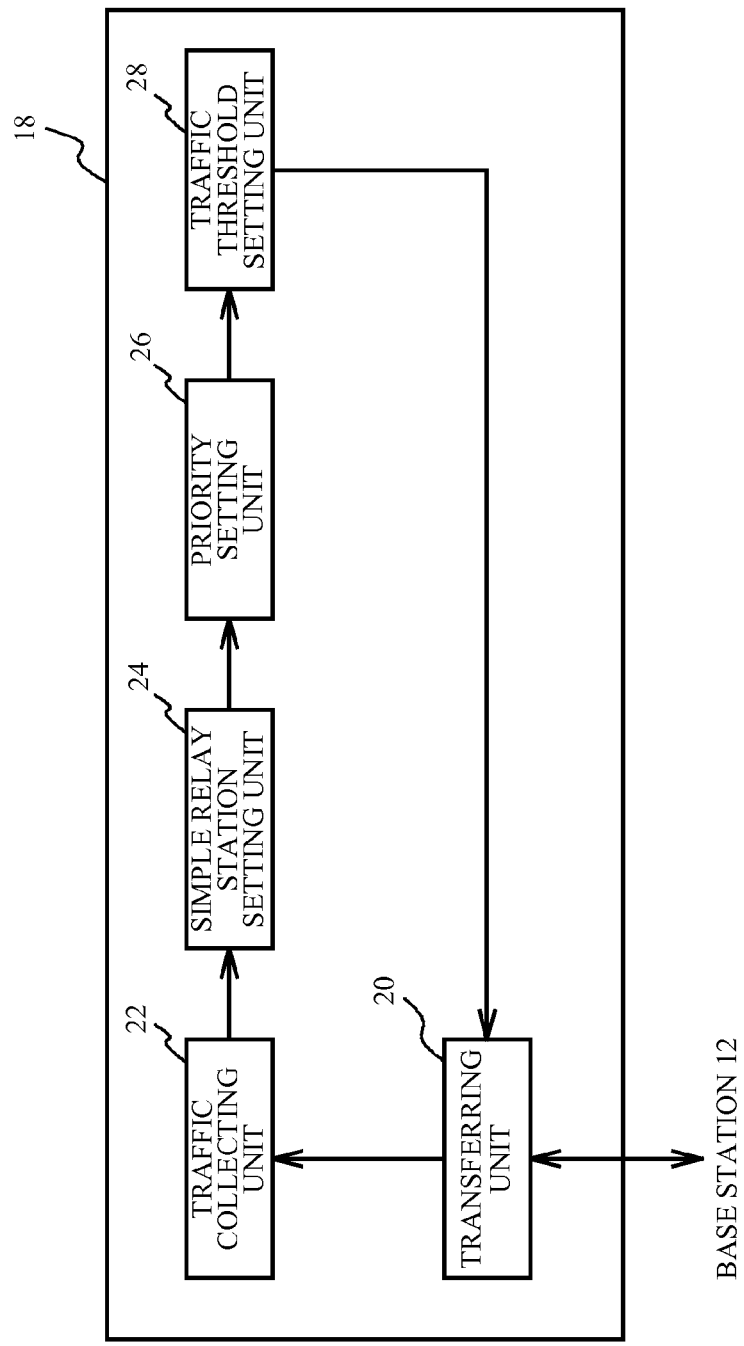
FIG. 3 is a block diagram of an OAM device.

FIG. 3 is a block diagram of the OAM device 18. The OAM device 18 includes a transferring unit 20, a traffic collecting unit 22, a simple relay station setting unit 24, a cooperation priority setting unit 26, and a traffic threshold setting unit 28. The transferring unit 20 performs data transfers to and from the base stations 12. The transferring unit 20 receives traffic information of respective communication node devices 10 from the base stations 12. The transferring unit 20 transfers cooperation priorities and traffic threshold values to the base stations. The traffic collecting unit 22 collects the traffic information of the respective communication node devices 10 from the respective base stations 12.

Based on the traffic information of the respective communication node devices 10, the simple relay station setting unit 24 performs setting of the respective communication node devices 10 to determine on which base station 12 each relay station 14 is to depend, so that the OAM device 18 can cover the areas. The cooperation priority setting unit 26 sets the cooperation priorities of the respective communication nodes. The cooperation priorities are the priorities indicative of which communication node device 10 should be the master communication node device 10a when communication node devices cooperate with one another in the cooperative communication mode or the relayed communication mode. The communication node device 10 with the highest cooperation priority preferentially becomes the master communication node device 10a. The cooperation priority setting unit 26 generates a cooperation priority, based on whether the communication node device is a base station 12 or a relay station 14, and whether the communication node device has a high processing capacity and a high-traffic area. For example, communication node devices 10 that are base stations and have high processing capacities, and communication node devices 10 located in high-traffic areas have high cooperation priorities. The traffic threshold setting unit 28 sets the traffic threshold values to be used to determine whether the communication mode is to be the cooperative communication mode or the relayed communication mode. As the traffic threshold values, a first threshold value th1 and a second threshold value th2 are set, for example.

Figure 4:
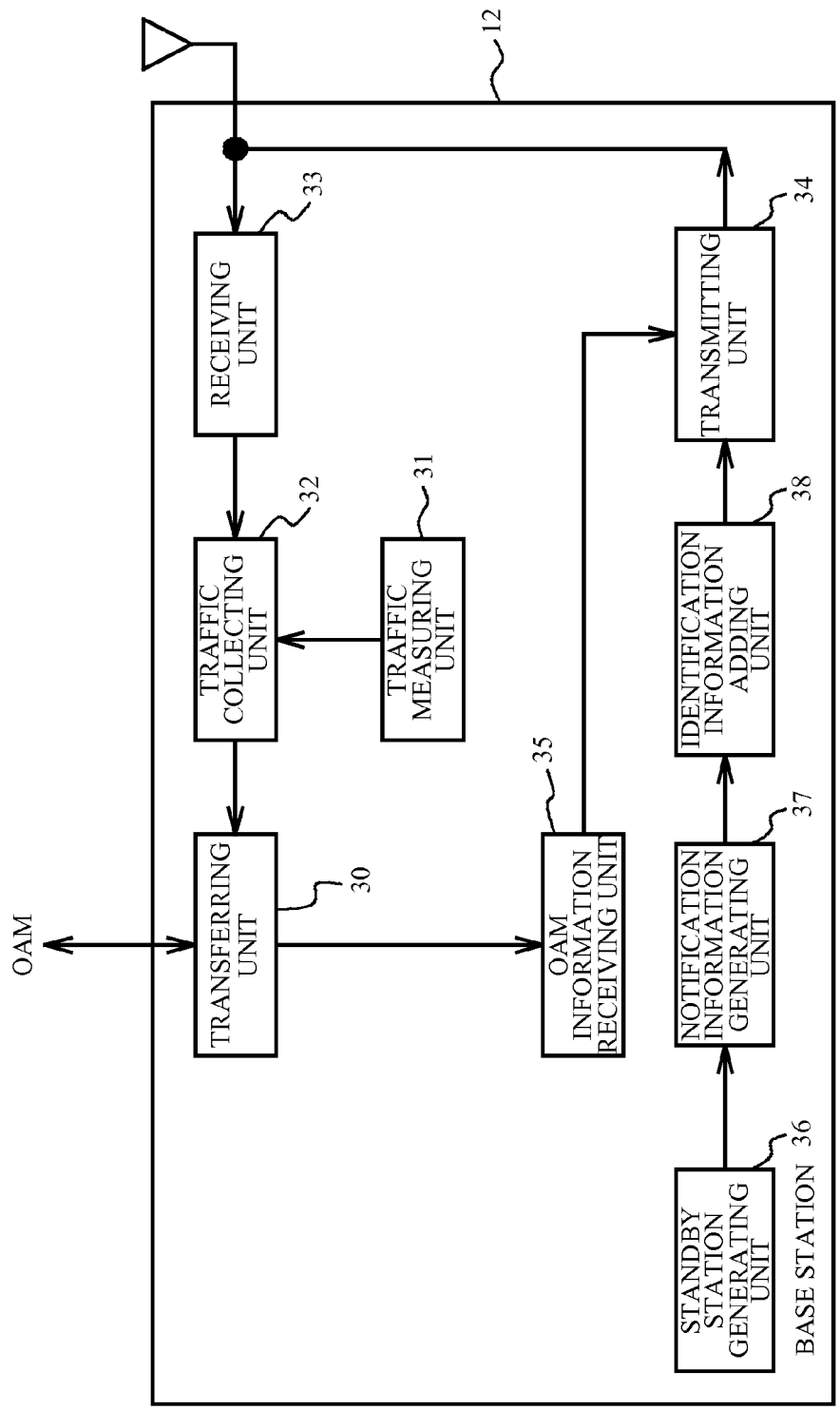
FIG. 4 is a block diagram of a base station.

FIG. 4 is a block diagram of a base station 12. A receiving unit 33 receives the traffic information of a subordinate relay station 14 via an antenna. A traffic measuring unit 31 measures the traffic of its own station. A traffic collecting unit 32 collects the traffic information of its own station and the traffic information of the subordinate relay station 14. A transferring unit 30 transfers the collected traffic information to the OAM device 18. An OAM information receiving unit 35 receives information from the OAM device 18. A standby station generating unit 36 will be described later. A notification information generating unit 37 generates notification information. An identification information adding unit 38 adds identification information to the notification information. A transmitting unit 34 transmits the notification information and the information from the OAM device 18 to the relay station 14 and a mobile terminal 16.

Figure 5:
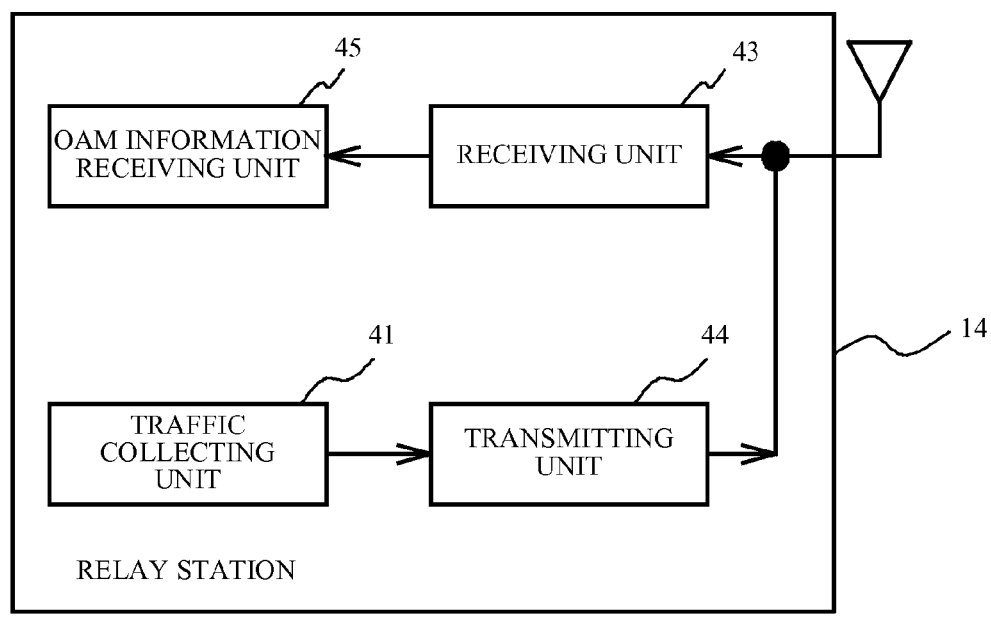
FIG. 5 is a block diagram of a relay station.

FIG. 5 is a block diagram of a relay station 14. A receiving unit 43 receives information from a base station 12. An OAM information receiving unit 45 receives OAM information. A traffic measuring unit 41 measures the traffic of its own station. A transmitting unit 44 transmits traffic information to the base station 12.

Figure 6:
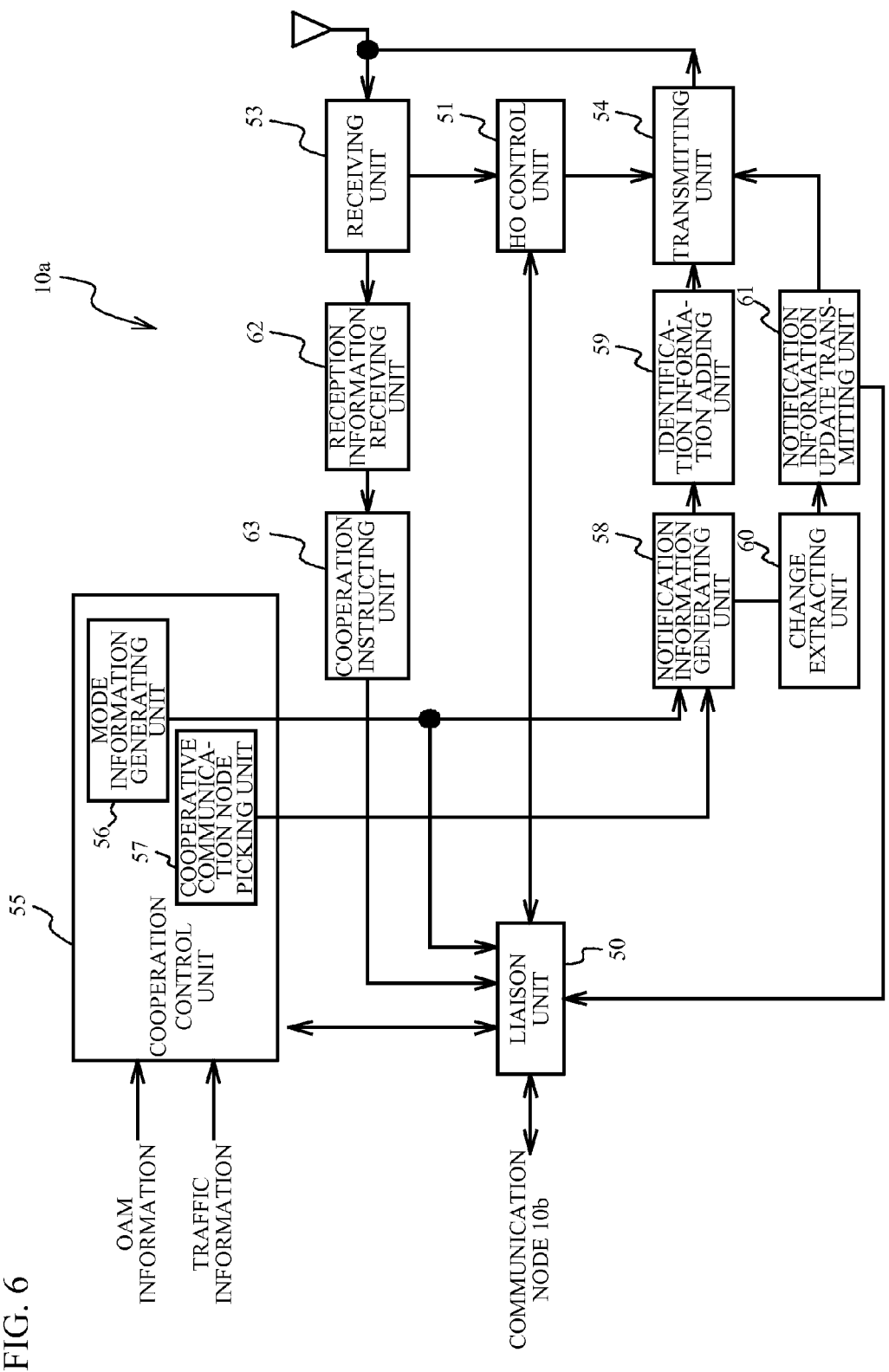
FIG. 6 is a block diagram illustrating a case where a base station or a relay station functions as a master communication node device.

FIG. 6 is a block diagram illustrating a case where a base station 12 or a relay station 14 functions as a master communication node device 10a. A cooperation control unit 55 (a mode selecting unit) acquires OAM information and traffic information. As will be described later, the cooperation control unit 55 also selects a master-slave (or parent-child) relationship, determines a slave communication node device 10b, and selects a communication mode. The cooperation control unit 55 includes a cooperative communication node picking unit 57 and a mode information generating unit 56. The cooperative communication node picking unit 57 picks out a slave communication node device 10b. The mode information generating unit 56 generates mode information indicating that the communication mode is the cooperative communication mode, the relayed communication mode, or the sleep mode. A notification information generating unit 58 generates notification information containing the result of the picking of the slave communication node device 10b and the communication mode. An identification information adding unit 59 adds identification information indicative of the communication node device of its own station, to the notification information. A transmitting unit 54 transmits the notification information to the slave communication node device 10b and a mobile terminal 16. A change extracting unit 60 determines whether there is a change made to the notification information. A notification information update transmitting unit 61 updates the notification information when there is a change made to the notification information, and transmits the updated notification information to the slave communication node device 10b and the mobile terminal 16 via the transmitting unit 54.

A receiving unit 53 receives information from the mobile terminal 16. A reception information receiving unit 62 receives the later described reception information from the mobile terminal 16. A cooperation instructing unit 63 instructs the slave communication node device 10b to perform a cooperative communication when the reception information is received. A liaison unit 50 informs another communication node device 10 of the information about the master and slave communication node devices determined by the cooperation control unit 55, and the information about the instruction from the cooperation instructing unit 63. A HO control unit 51 control handovers.

Figure 7:
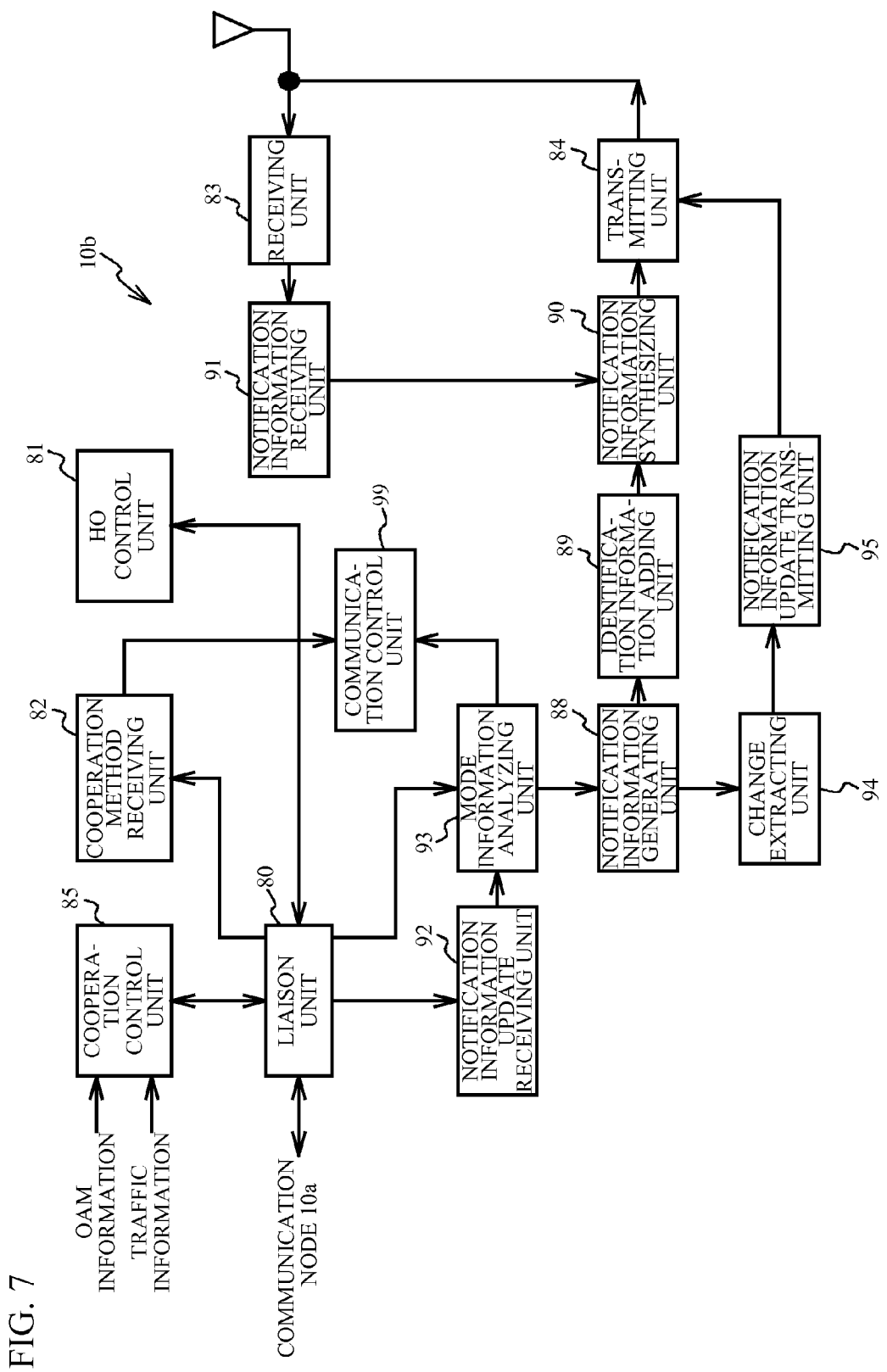
FIG. 7 is a block diagram illustrating a case where a base station or a relay station functions as a slave communication node device.

FIG. 7 is a block diagram showing a case where a base station 12 or a relay station 14 functions as a slave communication node device 10b. A liaison unit 80 receives mode information from another communication node device (a master communication node device 10a, for example). A cooperation control unit 85 acquires OAM information and traffic information, and selects a master-slave relationship.

In a case where a subject communication node device 10 is determined to be the slave communication node device 10b, a mode information analyzing unit 93 analyzes the mode information. If the mode information indicates that the communication mode is the cooperative communication mode, a notification information generating unit 88 generates notification information specific to the slave communication node device 10b. An identification information adding unit 89 adds identification information to the notification information. A receiving unit 83 receives information from the master communication node device 10a. A notification information receiving unit 91 receives notification information from the master communication node device 10a. A notification information synthesizing unit 90 combines the notification information of the master communication node device 10a and the notification information of the slave communication node device 10b. A transmitting unit 84 transmits the notification information to a mobile terminal 16. A notification information update receiving unit 92 receives information indicating whether the notification information has been updated. If the communication mode is changed, the mode information analyzing unit 93 analyzes the mode information. A change extracting unit 94 determines whether there is a change made to the notification information. If there is a change made to the notification information, a notification information update transmitting unit 95 updates and transmit the notification information. A cooperating method receiving unit 82 receives a notification of cooperative communication settings from the master communication node device 10a. A HO control unit 81 controls HOs. A communication control unit 99 changes the cooperation method or the like, based on the communication mode and the like.

Figure 8:
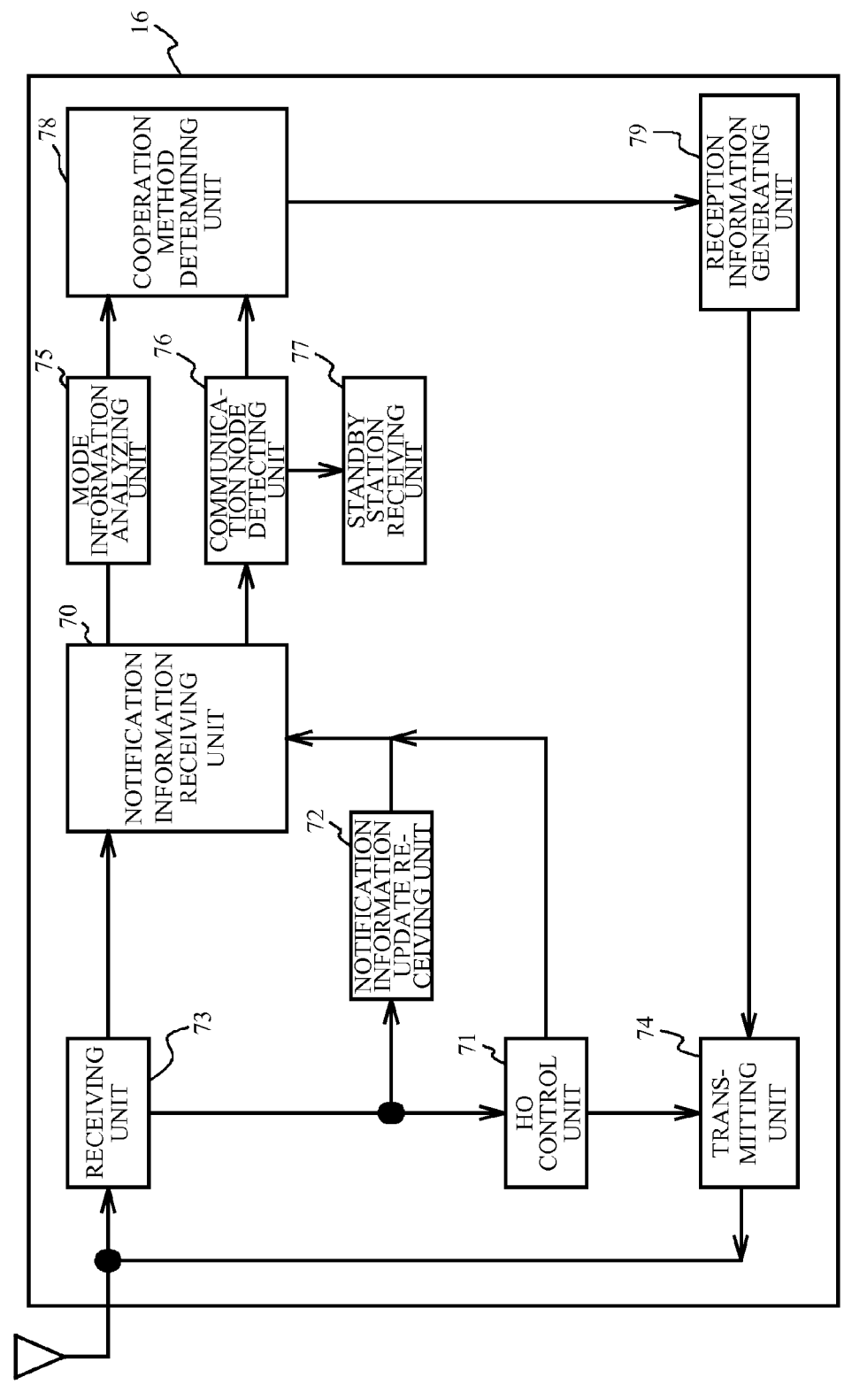
FIG. 8 is a block diagram of a mobile terminal.

FIG. 8 is a block diagram of a mobile terminal 16. A receiving unit 73 receives information from a communication node device 10. A notification information receiving unit 70 receives notification information from the communication node device 10. A mode information analyzing unit 75 analyzes the communication mode contained in the notification information of a slave communication node device 10b. A communication node detecting unit 76 detects the communication node device that has transmitted the notification information, based on the identification information added to the notification information. A standby station receiving unit 77 will be described later. Based on the mode information and the communication node device 10 detected by the communication node detecting unit 76, a cooperation method determining unit 78 determines a communication mode. In a case where the communication mode is the cooperative communication mode and the notification information specific to the slave communication node device 10b is received, a reception information generating unit 79 generates reception information indicating that the notification information has been received from the slave communication node device 10b. A transmitting unit 74 transmits the reception information to a master communication node device 10a. A notification information update receiving unit 72 receives information indicating whether the notification information has been updated. A HO control unit 71 controls handovers.

Figure 9:
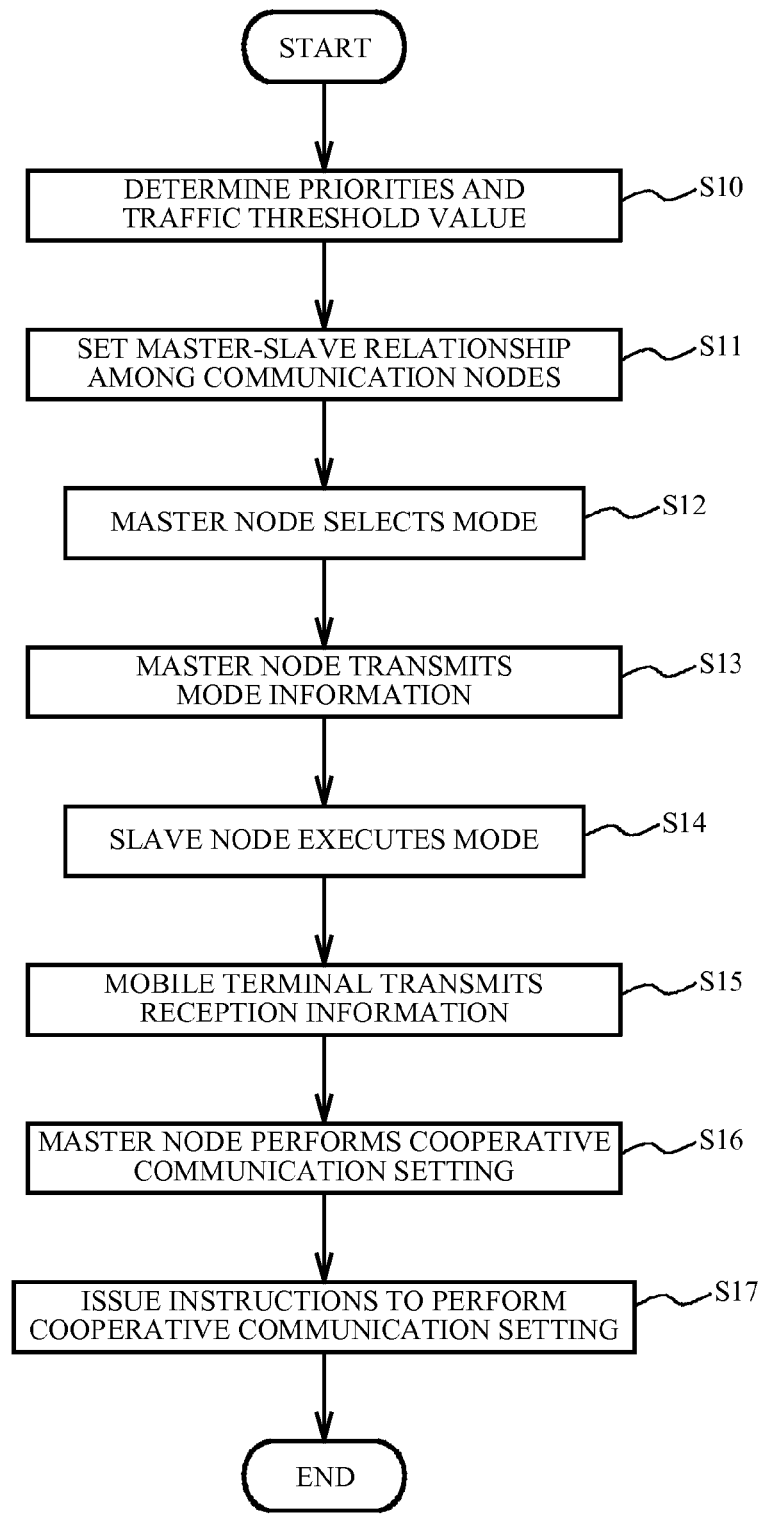
FIG. 9 is a flowchart showing the flow of procedures to be carried out in the communication system according to Embodiment 1.

Next, operations of the communication system of this embodiment are described. FIG. 9 is a flowchart showing the flow of procedures in the communication system according to Embodiment 1. As shown in FIG. 9, the OAM device 18 first determines cooperation priorities, a traffic threshold value, and the like (step S10). The cooperation control units 55 and 85 of communication node devices 10 set the master-slave relationship among all the communication node devices (step S11). The cooperation control unit 55 of a master communication node device 10a selects a communication mode from the cooperative communication mode, the relayed communication mode, and the sleep mode (step S12). The mode information generating unit 56 of the master communication node device 10a transmits mode information to a slave communication node device 10b and a mobile terminal 16 (step S13).

Based on the set communication mode, the communication control unit 99 of the slave communication node device 10b carries out procedures (step S14). For example, in the cooperative communication mode, the communication control unit 99 transmits specific notification information to the mobile terminal 16. Also, the communication control unit 99 cooperates with the master communication node device 10a, to transmit data to the mobile terminal 16. In the relayed communication mode, the communication control unit 99 relays notification information received from the master communication node device 10a to the mobile terminal 16. Also, the communication control unit 99 transmits data received from the master communication node device 10a to the mobile terminal 16. In the sleep mode, the communication control unit 99 suspends transmission of data to the mobile terminal 16. When receiving notification information from communication node devices 10 including the slave communication node device 10b, the mobile terminal 16 transmits reception information to the master communication node device 10a (step S15). The reception information contains the identification information of the communication node devices that have transmitted the notification information, and the information about a possible cooperative communication method. Receiving the reception information from the slave communication node device 10b, the cooperation instructing unit 63 of the master communication node device 10a identifies the slave communication node device 10b from the identification information, and, based on the information about the cooperative communication method, performs cooperative communication setting (step S16). The cooperation instructing unit 63 of the master communication node device 10a instructs the slave communication node device 10b to perform cooperative communication setting (step S17).

FIGS. 10A through 10D are diagrams illustrating the flow shown in FIG. 9. As shown in FIG. 10A, the master communication node device 10a transmits the mode information to the slave communication node device 10b (step S13). It should be noted that, in Embodiment 1, the mode information is contained in the notification information, and is transmitted to the slave communication node device 10b and the mobile terminal 16.

Figure 10B:
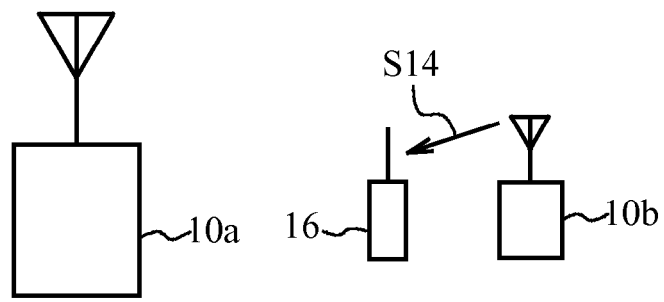
Figure 10C:
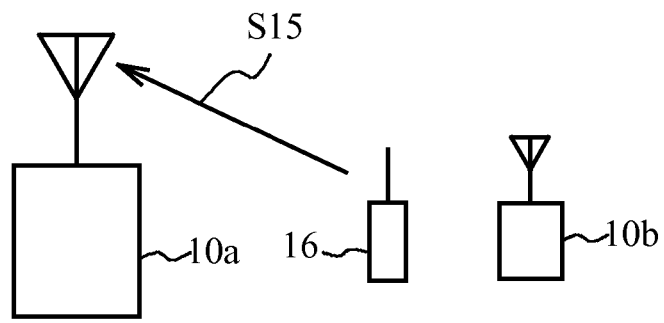
Figure 10D:
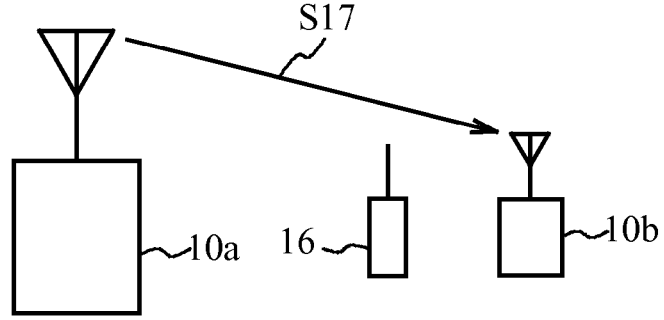

As shown in FIG. 10B, in a case where the mode information indicates the cooperative communication mode, the slave communication node device 10b transmits specific notification information to the mobile terminal 16 (step S14). As shown in FIG. 10(c), the mobile terminal 16 transmits the reception information to the master communication node device 10a (step S15). As shown in FIG. 10D, the master communication node device 10a instructs the slave communication node device 10b to perform cooperative communication setting (step S17).

Figure 11:
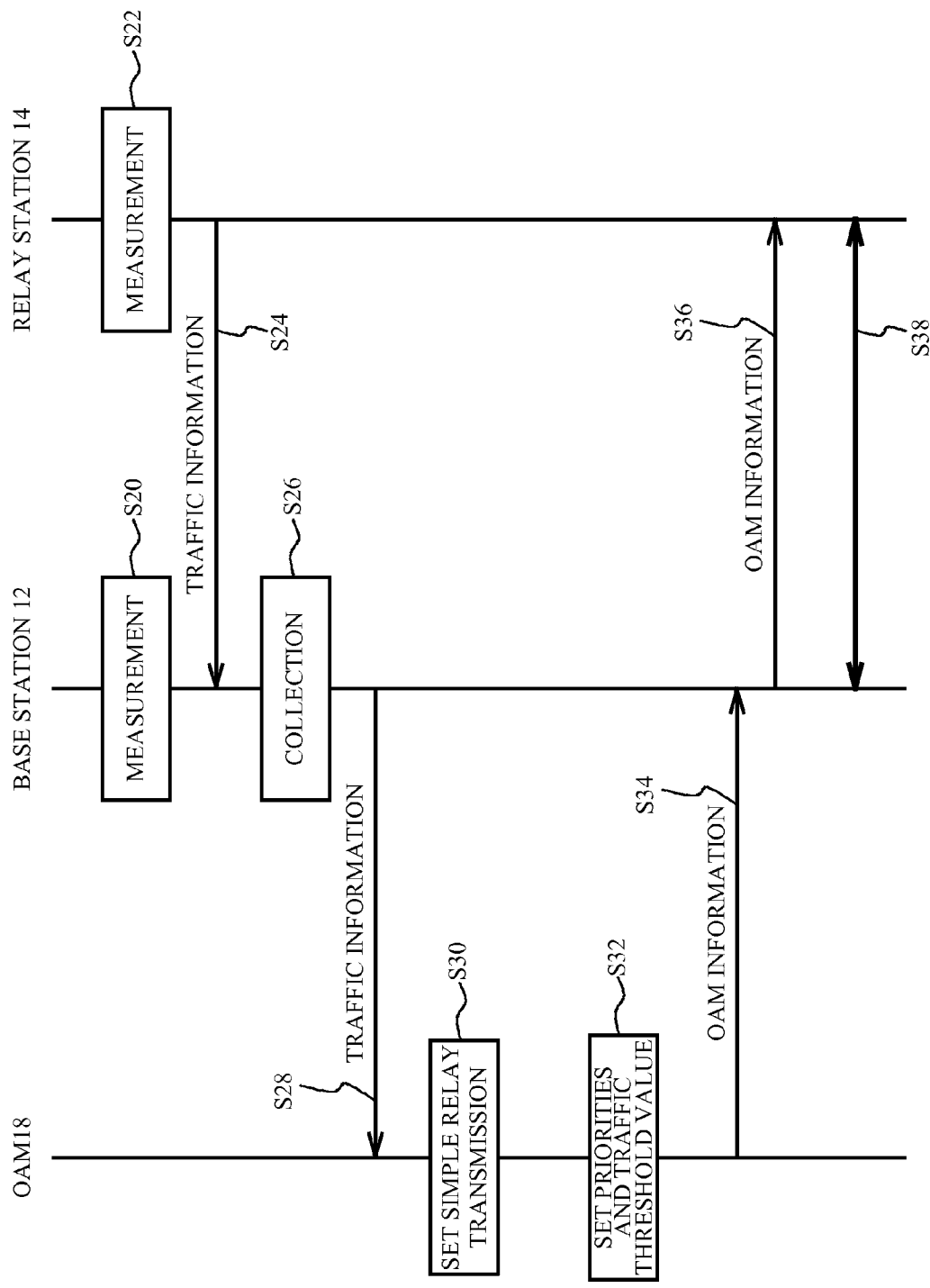
FIG. 11 is a sequence diagram for explaining step S11 of FIG. 9.

Next, the respective steps shown in FIG. 9 are described in detail. FIG. 11 is a sequence diagram of the OAM device 18, a base station 12, and a relay station 14 for explaining step S10 of FIG. 9. The traffic measuring unit 31 of the base station 12 measures its traffic (step S20). The traffic measuring unit 41 of the relay station 14 measures its traffic (step S22). The transmitting unit 44 of the relay station 14 transmits information about the traffic to the base station 12, and the receiving unit 33 of the base station 12 receives the traffic information (step S24). The traffic collecting unit 32 of the base station 12 collects the traffic information of its own station and subordinate relay stations 14 (step S26). The transferring unit 30 of the base station 12 transmits the collected traffic information to the OAM device 18, and the transferring unit 20 of the OAM device 18 receives the traffic information (step S28). The traffic collecting unit 22 of the OAM device 18 collects the traffic information from respective base stations.

As described above with reference to FIG. 3, the simple relay station setting unit 24 of the OAM device 18 performs setting of each communication node device 10, so as to be able to perform simple relays (step S30). The cooperation priority setting unit 26 generates cooperation priorities, and the traffic threshold setting unit 28 generates a traffic threshold value (step S32). The transferring unit 20 of the OAM device 18 transmits the cooperation priorities and the traffic threshold value (the OAM information) to the base station 12. The OAM information receiving unit 35 of the base station 12 receives the cooperation priorities and the traffic threshold value via the transferring unit 30 (step S34). The transmitting unit 34 of the base station 12 transmits the cooperation priorities and the traffic threshold value to the relay station 14. The OAM information receiving unit 45 of the relay station 14 receives the cooperation priorities and the traffic threshold value via the receiving unit 43 (step S36). The base station 12, the relay station 14, and the like determine the master and slave communication node devices, and determine a communication mode (step S38).

Figure 12:
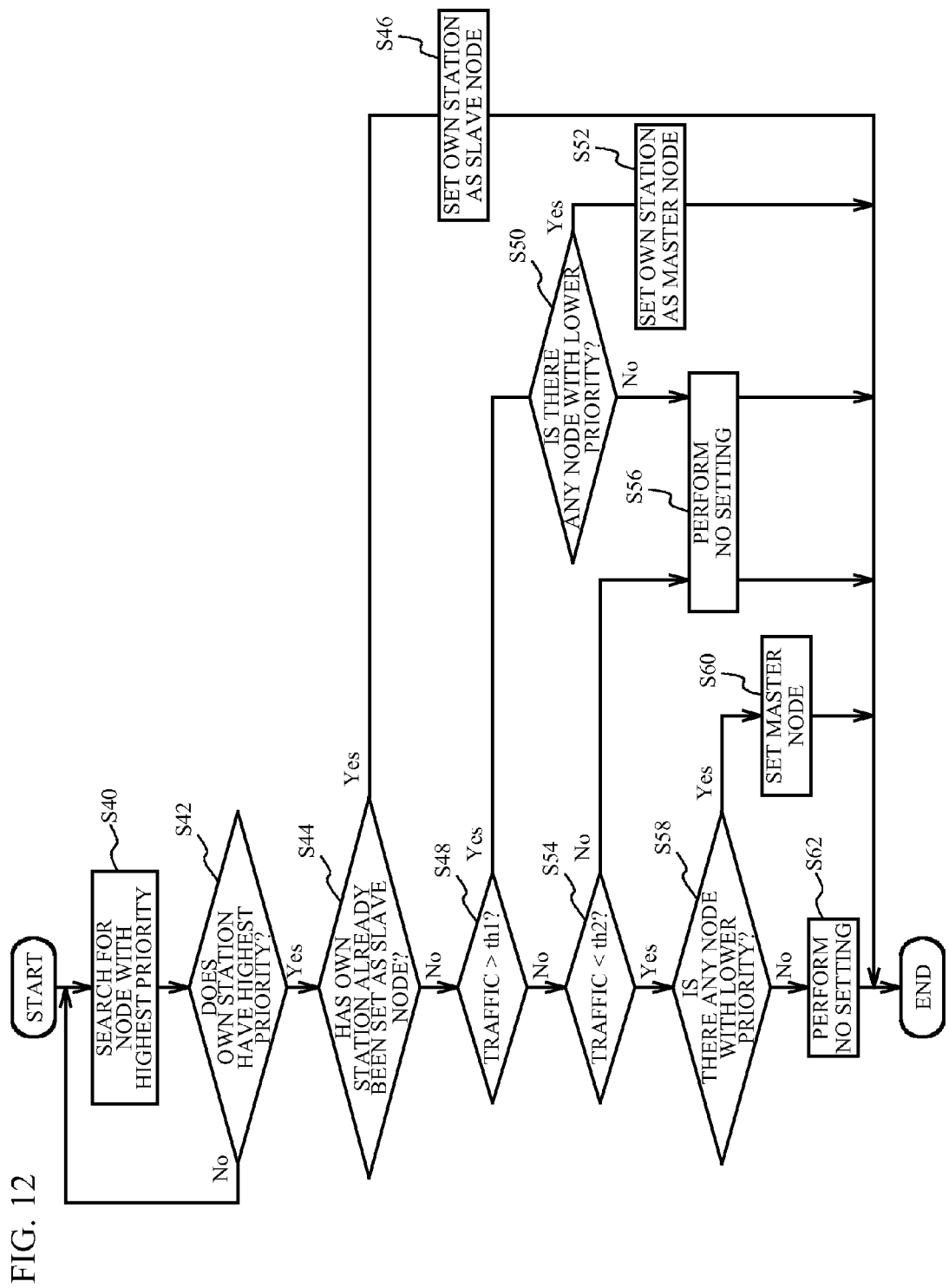
FIG. 12 is a flowchart showing the procedures to be carried out by the cooperation control units of a master communication node device and a slave communication node device.

Next, step S11 of FIG. 9 is described in detail. FIG. 12 is a flowchart showing the procedures to be carried out by the cooperation control unit 55 of the master communication node device 10a and the cooperation control unit 85 of the slave communication node device 10b. The cooperation control unit 55 or 85 searches for the communication node device with the highest cooperation priority (step S40). That is, the cooperation control unit 55 or 85 searches for the communication node device that is most suitable to be the master communication node device. The cooperation control unit 55 or 85 then determines whether its own station has the highest cooperation priority (step S42). If the result indicates "No," the cooperation control unit 55 or 85 stands by until the settings of the communication node devices with the higher cooperation priorities than its own station are completed.

If the result of step S42 indicates "Yes," the cooperation control unit 55 or 85 determines whether its own station has been set as a slave communication node device (step S44). If the result indicates "Yes," the communication node device of its own station is a slave communication node device 10b, and thereafter, functions as a slave communication node device 10b (step S46). If the result of step S44 indicates "No," the cooperation control unit 55 determines whether the traffic of the communication node device of its own station is higher than the traffic threshold value th1 (step S48). If the result indicates "Yes," the cooperation communication node picking unit 57 picks out a communication node device with a lower cooperation priority than that of its own station. Based on the result of the picking operation by the cooperative communication node picking unit 57, the cooperation control unit 55 determines whether there exists a communication node device with a lower cooperation priority than that of its own station (step S50). If the result indicates "Yes," the cooperation control unit 55 sets its own station as the master communication node device 10a (step S52). If the result of step S50 indicates "No," the cooperation control unit 55 does not perform new setting (step S56). In this manner, the communication node device of its own station functions as a simple communication node device.

If the result of step S48 indicates "No," the cooperation control unit 55 determines whether the traffic of the communication node device of its own station is lower than the traffic threshold value th2 (step S54). If the result indicates "No," the cooperation control unit 55 does not perform new setting (step S56). If the result of step S54 indicates "Yes," the cooperation control unit 55 determines whether there exists a communication node device with a lower cooperation priority than that of its own station (step S58). If the result indicates "Yes," the cooperation control unit 55 sets its own station as the master communication node device 10a (step S60). If the result of step S58 indicates "No," the cooperation control unit 55 does not perform new setting (step S62).

Figure 13:
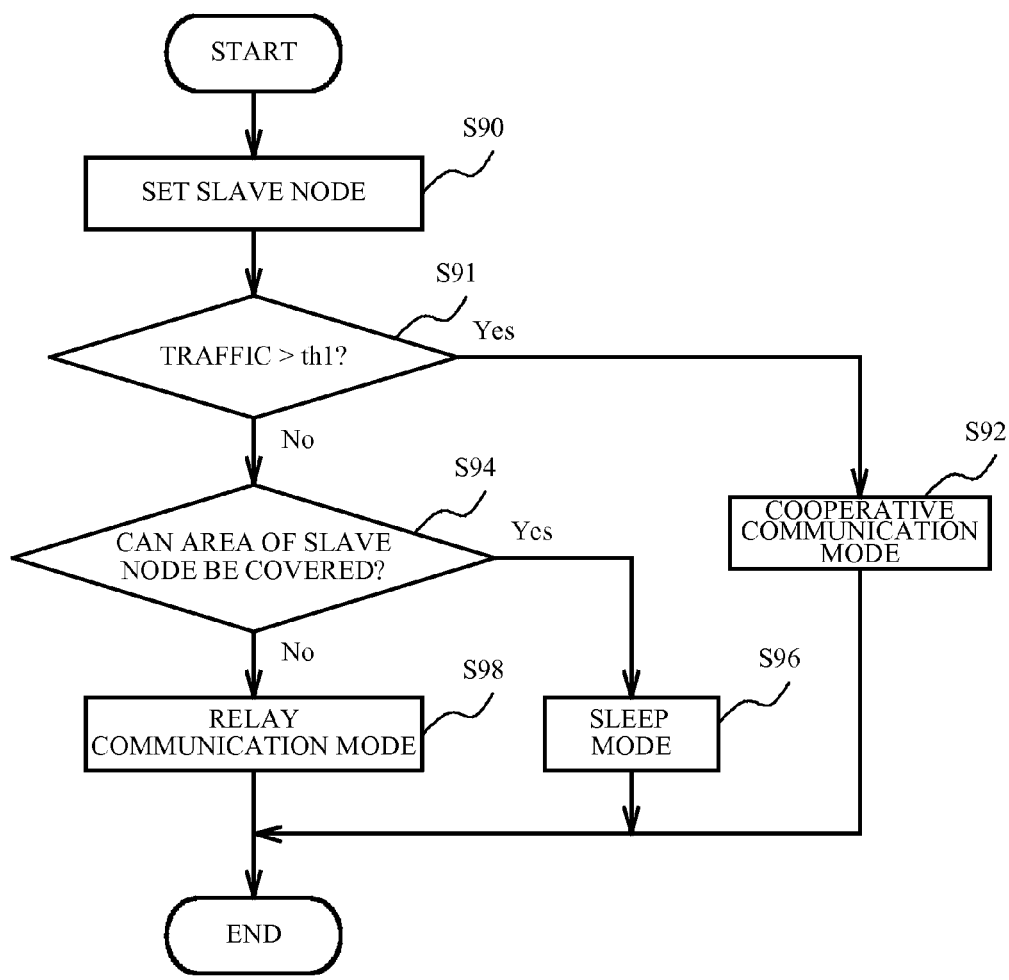
FIG. 13 is a flowchart showing the procedures to be carried out by the cooperation control unit of a master communication node device.

FIG. 13 is a flowchart showing the procedures to be carried out by the cooperation control unit 55 of the master communication node device 10a in a case where its own station is set as the master communication node device 10a in steps S52 and S60 of FIG. 12. As shown in FIG. 13, the cooperation control unit 55 sets a communication node device with a lower cooperation priority than that of its own station, as a slave communication node device 10b (step S90). The cooperation control unit 55 determines whether its traffic is higher than the traffic threshold value th1 (step S91). If the result indicates "Yes," the cooperation control unit 55 determines the communication mode to be the cooperative communication mode (step S92). In response to that, the mode information generating unit 56 generates the mode information. If the result of step S91 indicates "No," the traffic is lower than the traffic threshold value th2 (this case is equivalent to step S60 of FIG. 12). The cooperation control unit 55 determines whether the master communication node device 10a of its own station can cover the area of the slave communication node device 10b (step S94). It the result indicates "Yes," the communication mode is switched to the sleep mode (step S96). If the result of step S94 indicates "No," the cooperation control unit 55 determines the communication mode to be the relayed communication mode (step S98).

In a case where its own station is not a slave communication node device, the traffic is higher than the traffic threshold value th1, and there exists a cooperative communication node device, as described above, cooperative communications are performed with the cooperative communication node device. Accordingly, where the traffic is high, the communication rate can be improved. In a case where the traffic is lower than the traffic threshold value th2, and the area of the slave communication node device 10b can be covered, on the other hand, the slave communication node device 10b is suspended, to save the resource. In a case where the traffic is lower than the traffic threshold value th2, and the area of the slave communication node device 10b cannot be covered, the relayed communication mode is set.

Figure 14:
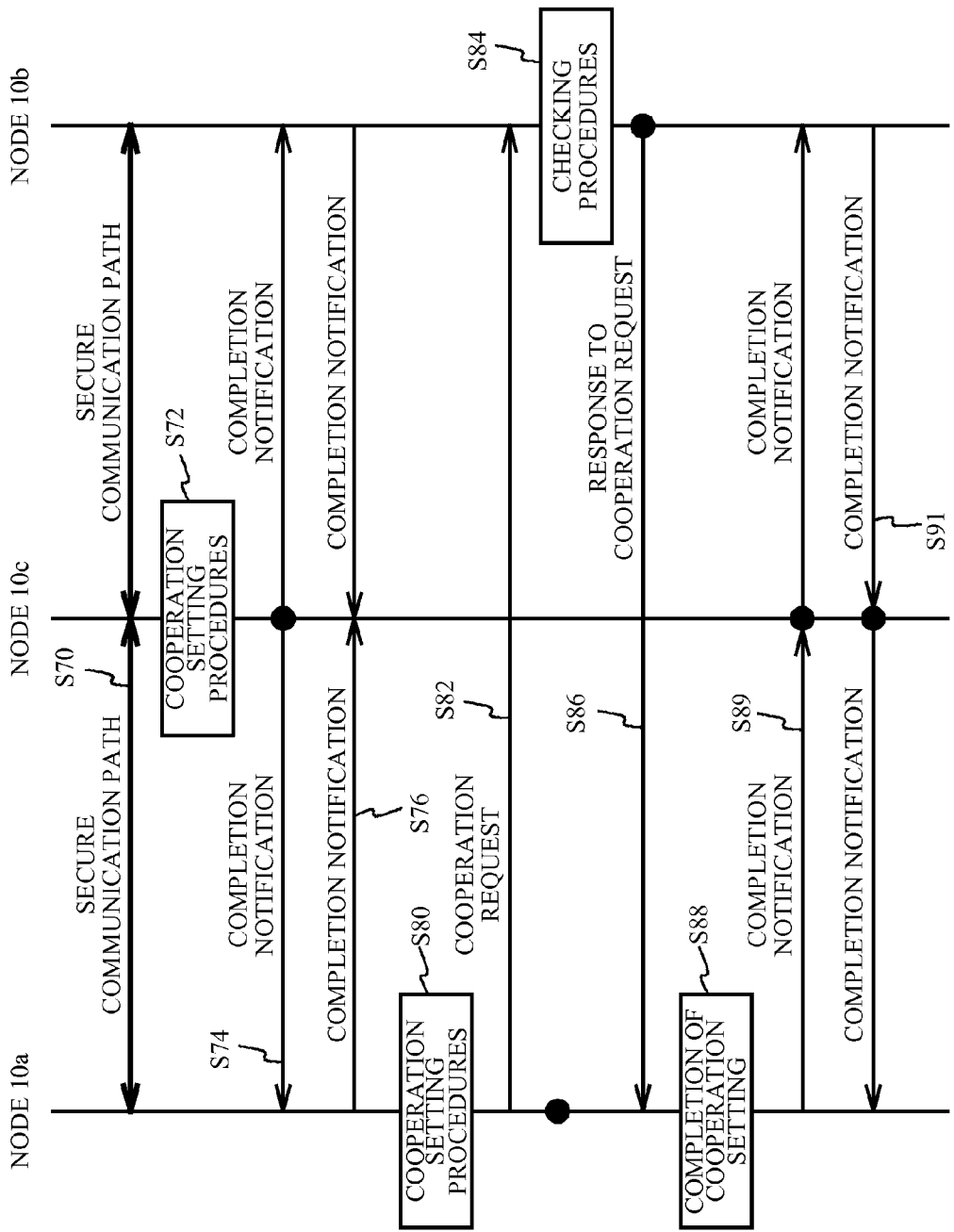
FIG. 14 is a sequence diagram of respective communication node devices.

FIG. 14 is a sequence diagram of respective communication node devices. The communication node device 10c represents the communication node device with the highest cooperation priority, and the communication node device 10b represents the communication node device with the lowest cooperation priority.

First, communication paths are secured among the respective communication node devices 10a through 10c (step S70). The communication node device 10c with the highest cooperation priority performs cooperation setting (step S72). That is, the procedures shown in FIGS. 12 and 13 are carried out. The communication node device 10c notifies the other communication node devices 10a and 10b of completion of the cooperation setting procedures (step S74). The communication node devices 10a and 10b transmit responses to the communication node device 10c (step S76). The communication node device 10a with the second highest cooperation priority then carries out the cooperation setting procedures shown in FIGS. 12 and 13 (step S80). The master communication node device 10a transmits a request to the slave communication node device 10b to determine whether cooperation is possible (step S82). The slave communication node device 10b makes a check to determine whether cooperation is possible (step S84). The slave communication node device 10b transmits a response to notify the master communication node device 10a that cooperation is possible (step S86). Steps S82 through S86 are equivalent to step S90 of FIG. 13. The master communication node device 10a completes the cooperation setting (step S88). The communication node device 10a notifies the communication node devices 10b and 10c of completion of the cooperation setting (step S89). The communication node devices 10b and 10c transmit responses to the communication node device 10a (step S91).

Figure 15:
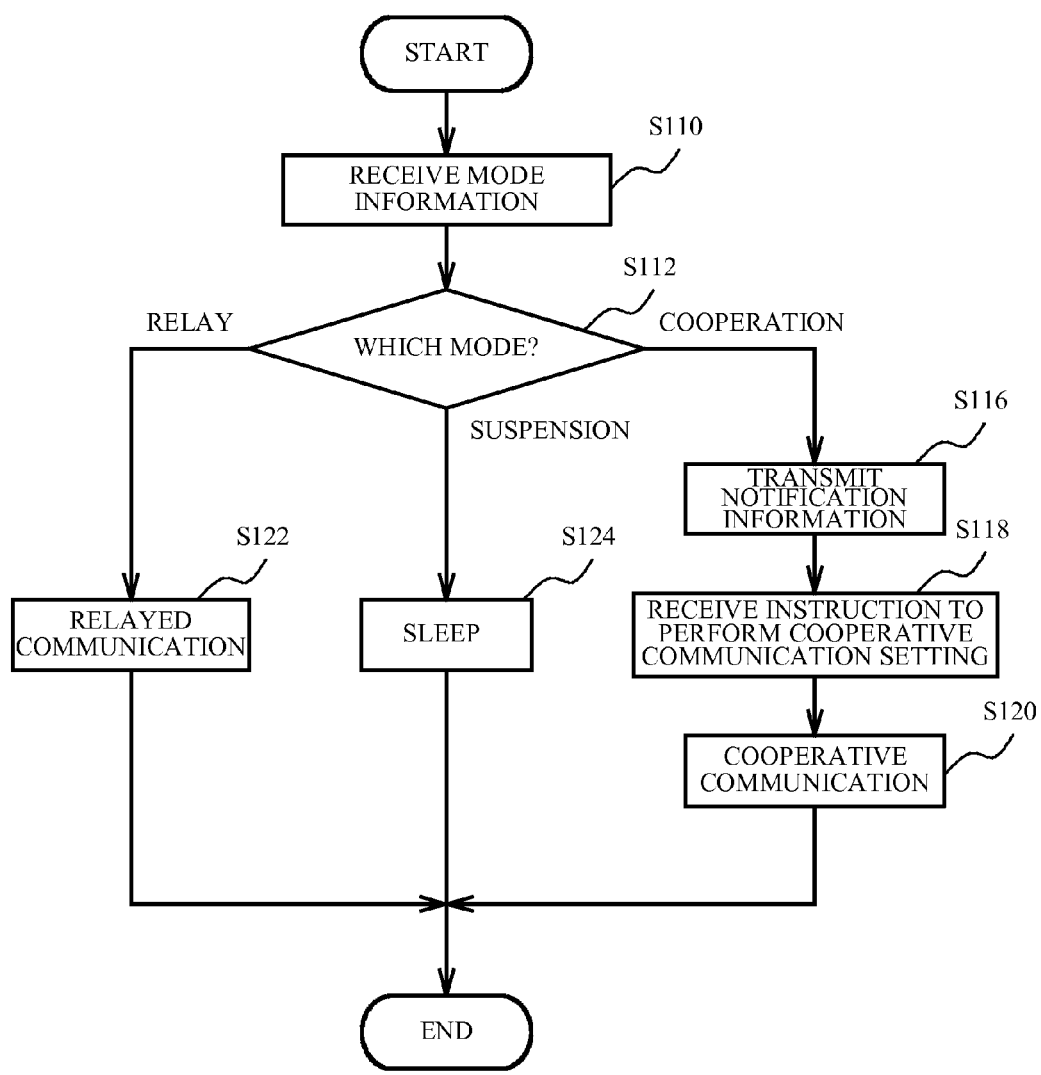
FIG. 15 is a flowchart showing the procedures to be carried out by a slave communication node device.

The procedure of step S14 of FIG. 9 is now described. FIG. 15 is a flowchart showing the procedures to be carried out by the slave communication node device 10b. The mode information analyzing unit 93 of the slave communication node device 10b receives the mode information from the master communication node device 10a via the liaison unit 80 (step S110). The mode information analyzing unit 93 analyzes the mode information (step S112). If the result of the mode analysis indicates that the communication mode is the cooperative communication mode, the notification information generating unit 88 generates specific notification information for cooperative communications, and transmits the specific notification information to the mobile terminal 16 (step S116). The cooperation method receiving unit 82 receives an instruction to perform cooperative communication setting (see step S17 of FIG. 9) (step S118). The communication control unit 99 performs a cooperative communication (step S120). If the communication mode is determined to be the relayed communication mode in step S112 (step S122), the communication control unit 99 performs a relayed communication (step S122). If the communication mode is determined to be the sleep mode in step S112, the communication control unit 99 suspends the transmission of the notification information to the mobile terminal 16 (step S124).

Figure 16:
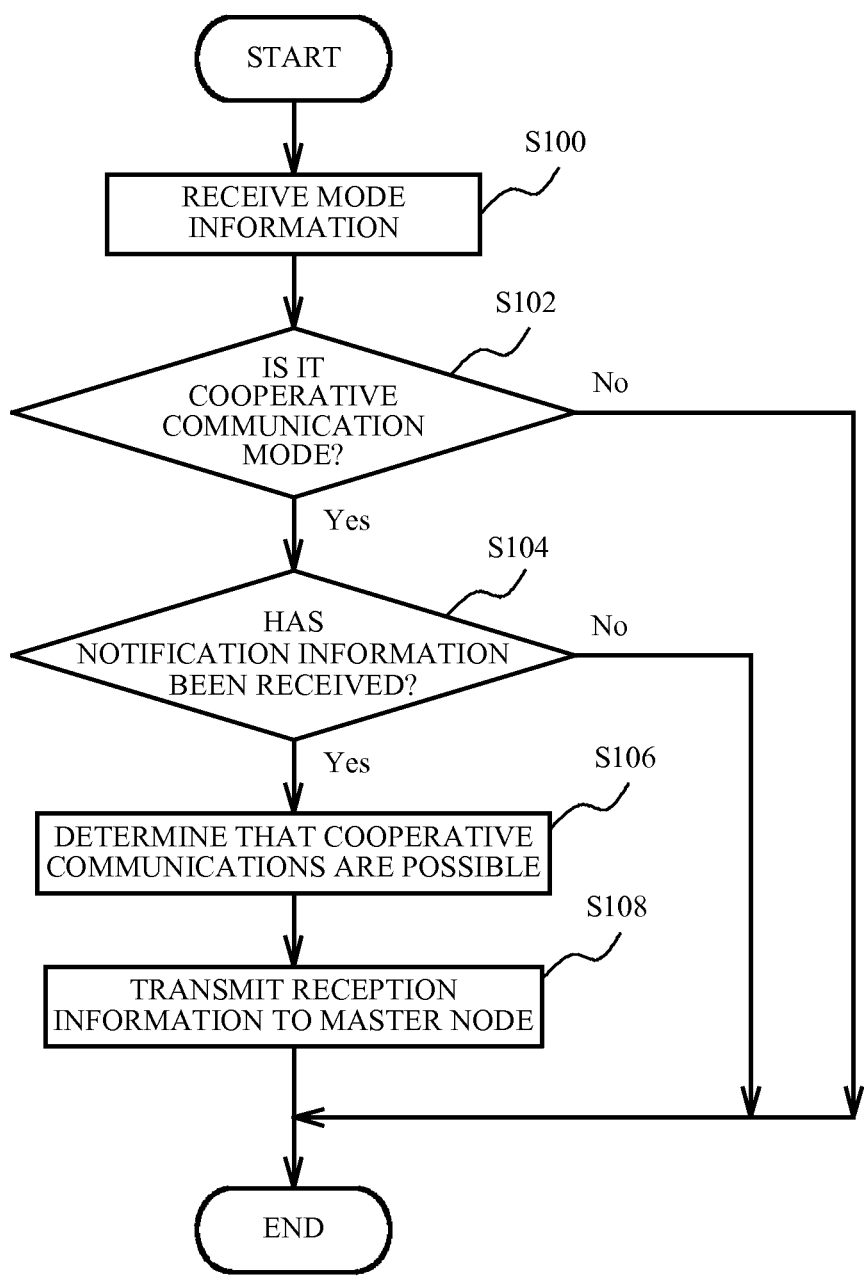
FIG. 16 is a flowchart showing the procedures to be carried out by a mobile terminal.

FIG. 16 is a flowchart showing the procedures to be carried out by the mobile terminal 16. As shown in FIG. 16, the mode information analyzing unit 75 of the mobile terminal 16 receives the mode information (step S100). The mode information analyzing unit 75 determines whether the mode information indicates that the communication mode is the cooperative communication mode (step S102). If the result indicates "Yes," the cooperation method determining unit 78 determines whether the communication node detecting unit 76 has received the notification information of the slave communication node device 10b (step S104). If the result indicates "Yes," the cooperation method determining unit 78 determines that the master communication node device 10a and the slave communication node device 10b can perform cooperative communications (step S106). The reception information generating unit 79 generates the reception information indicating the reception of the notification information of the slave communication node device 10b, and transmits the reception information to the master communication node device 10a via the transmitting unit 74 (step S108). The reception information contains the identification information of the slave communication node device 10b and the information about the method for cooperative communications that can be performed with the slave communication node device 10b. If the result of step S102 or S104 indicates "No," the operation comes to an end.

Figure 17:
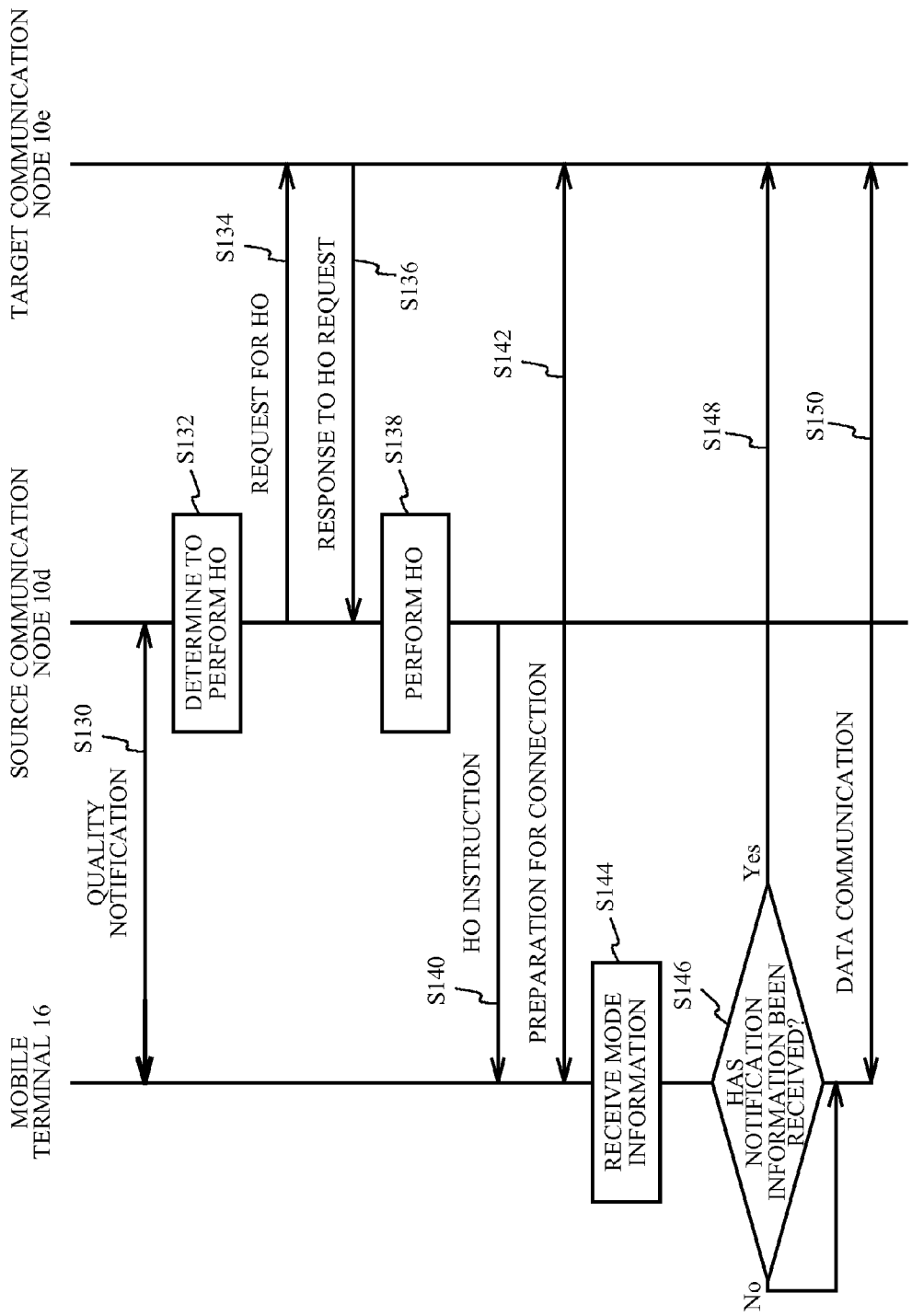
FIG. 17 is a sequence diagram showing a handover process.

FIG. 17 is a sequence diagram showing handover procedures. As shown in FIG. 17, the mobile terminal 16 notifies a source communication node device 10d of the quality of communications between the source communication node device 10d and the mobile terminal 16, and the quality of communications between a target communication node device 10e and the mobile terminal 16 (step S130). Based on the communication qualities, the source communication node device 10d determines to perform a handover (HO) (step S132). The source communication node device 10d sends a request for a HO to the target communication node device 10e (step S134). The target communication node device 10e responds to the HO request (step S136). The source communication node device 10d performs a HO (step S138). The source communication node device 10d instructs the mobile terminal 16 to perform a HO (step S140). The mobile terminal 16 and the target communication node device 10e prepare for a connection (step S142). As in step S100 of FIG. 16, the mobile terminal 16 receives the mode information (step S144). As in step S104 of FIG. 16, the mobile terminal 16 determines whether the notification information of the slave communication node device 10b has been received (step S146). If the result indicates "Yes," the reception information is transmitted to the target communication node device 10e (step S148). After that, the mobile terminal 16 and the target communication node device 10e perform a cooperative communication or a relayed communication (step S150).

Next, the notification information transmission in Embodiment 1 is described. In the following example, the master communication node device 10a transmits mode information as part of notification information.

Figure 18:
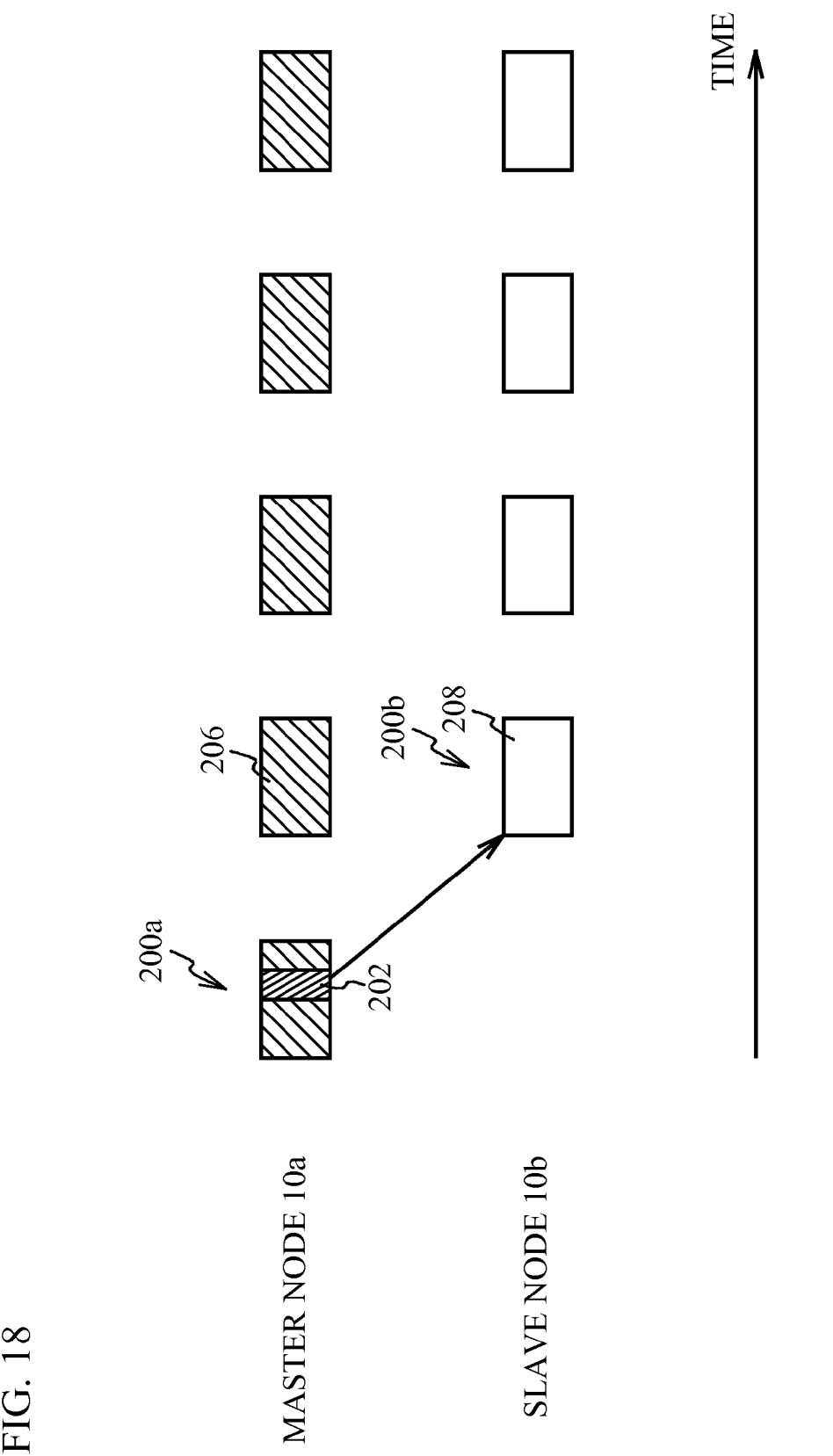
FIG. 18 is a diagram showing notification information in the cooperative communication mode.

FIG. 18 is a diagram showing the notification information in the cooperative communication mode. The master communication node device 10a transmits notification information 200a to the slave communication node device 10b and the mobile terminal 16. The slave communication node device 10b transmits notification information 200b to the mobile terminal 16. The master communication node device 10a causes the notification information 200a to contain mode information 202. The mode information indicates the cooperative communication mode. Accordingly, the slave communication node device 10b transmits specific notification information 208 that differs from notification information 206 of the master communication node device 10a, to the mobile terminal 16.

Figure 19:
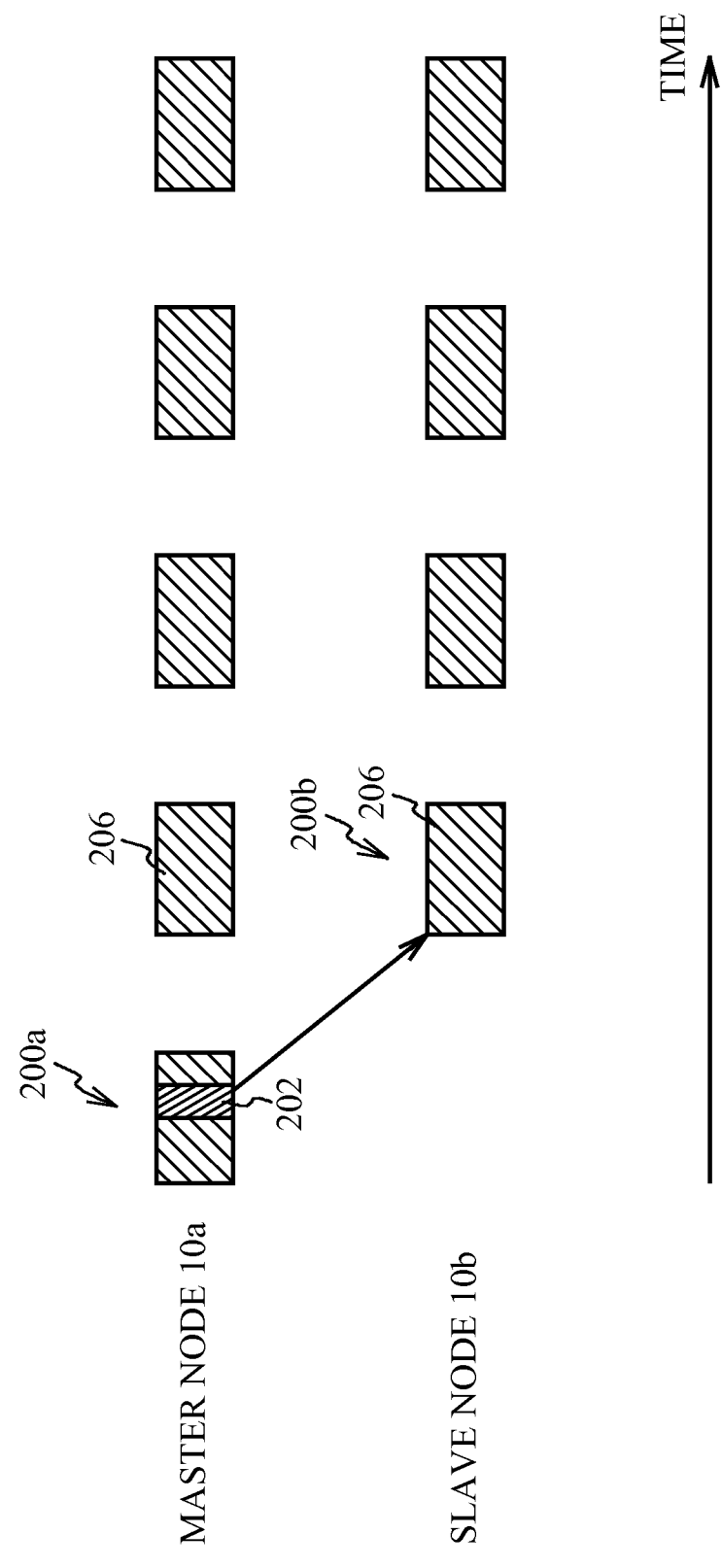
FIG. 19 is a diagram showing notification information in the relayed communication mode.

FIG. 19 is a diagram showing the notification information in the relayed communication mode. The mode information 202 contained in the notification information 200a of the master communication node device 10a indicates the relayed communication mode. Accordingly, the slave communication node device 10b transmits the notification information 206 of the master communication node device 10a as it is to the mobile terminal 16.

Figure 20:
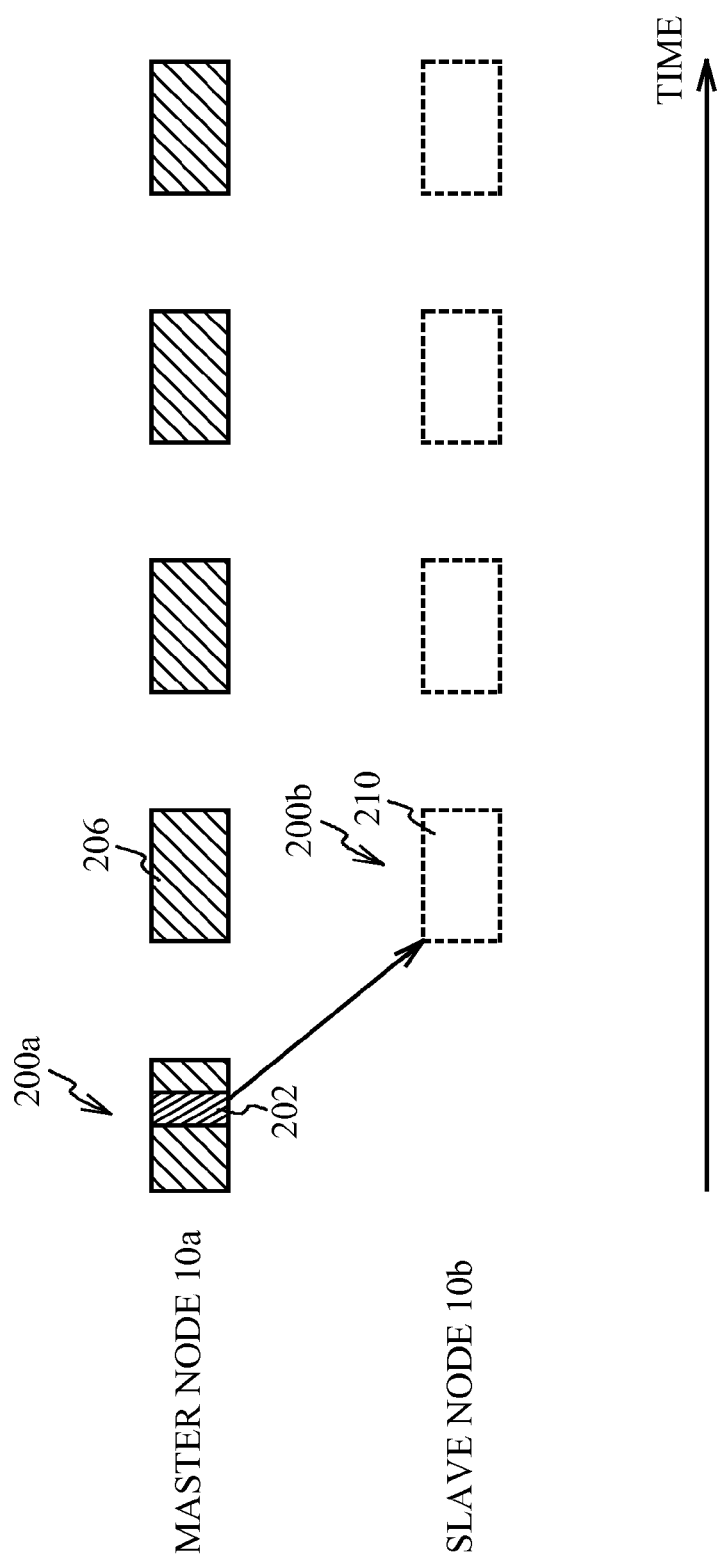
FIG. 20 is a diagram showing notification information in the sleep mode.

FIG. 20 is a diagram showing the notification information in the sleep mode. The mode information 202 contained in the notification information 200a of the master communication node device 10a indicates the sleep mode. Accordingly, the slave communication node device 10b does not transmit notification information 210 to the mobile terminal 16.

Next, a case where notification information is changed halfway is described. When notification information is changed, paging information indicating the change in the notification information is transmitted. When a change is made to notification information of the master communication node device 10a, the change extracting unit 60 of the master communication node device 10a extracts the change made to the notification information. The notification information update transmitting unit 61 updates and transmits the notification information. Accordingly, the mobile terminal 16 can recognize the change made to the notification information.

Figure 21:
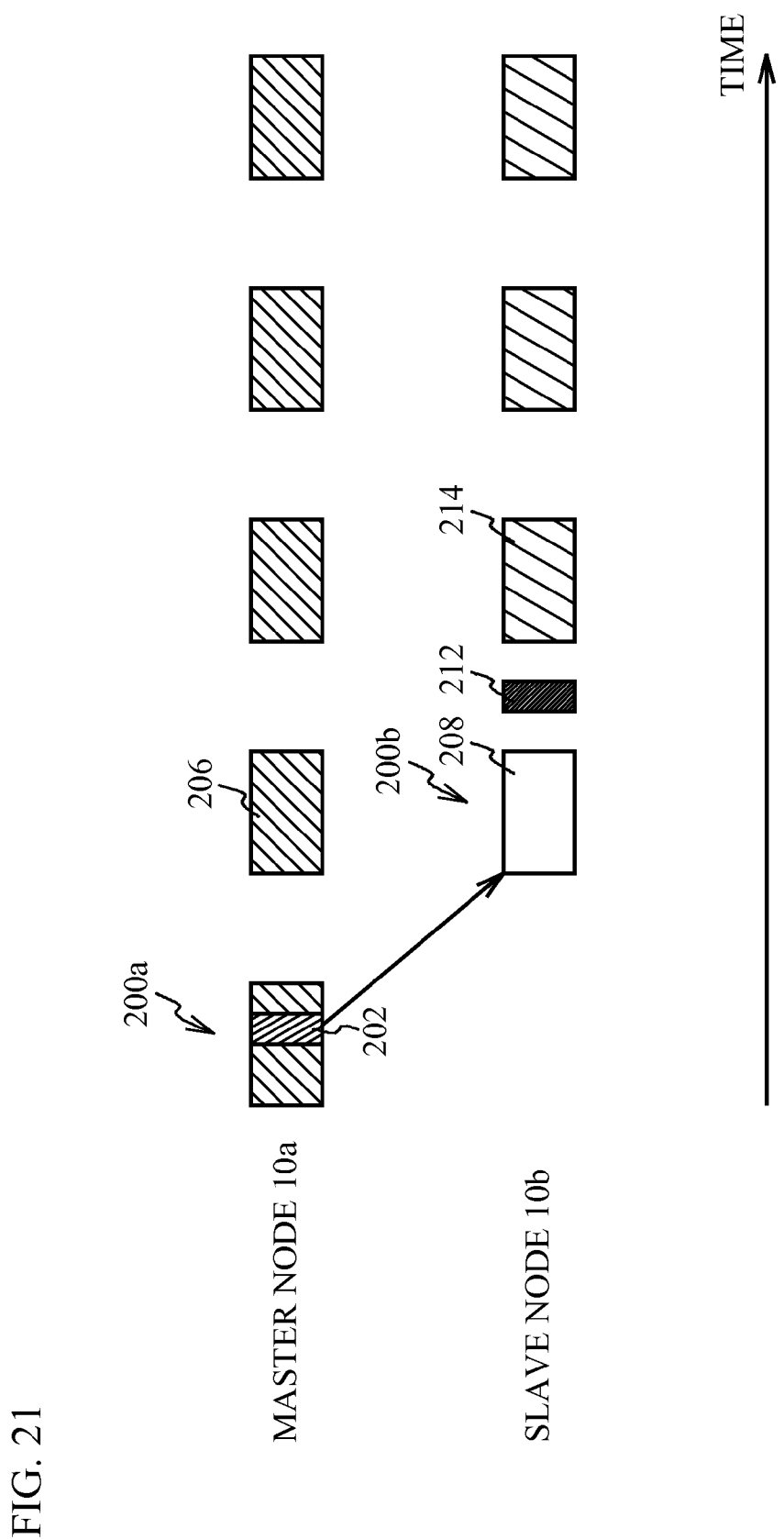
FIG. 21 is a diagram illustrating an example case where a change is made to specific notification information of a slave communication node device.

FIG. 21 is a diagram showing an example case where a change is made to specific notification information of the slave communication node device 10b. If a change is made to notification information after the slave communication node device 10b transmits the specific notification information 208, the change extracting unit 94 of the slave communication node device 10b extracts the change made to the notification information. The notification information update transmitting unit 95 transmits slave paging information 212. After that, the slave communication node device 10b transmits the changed notification information 214. From the slave paging information 212, the notification information update receiving unit 72 of the mobile terminal 16 can recognize that the notification information of the slave communication node device 10b has been updated.

Figure 22:
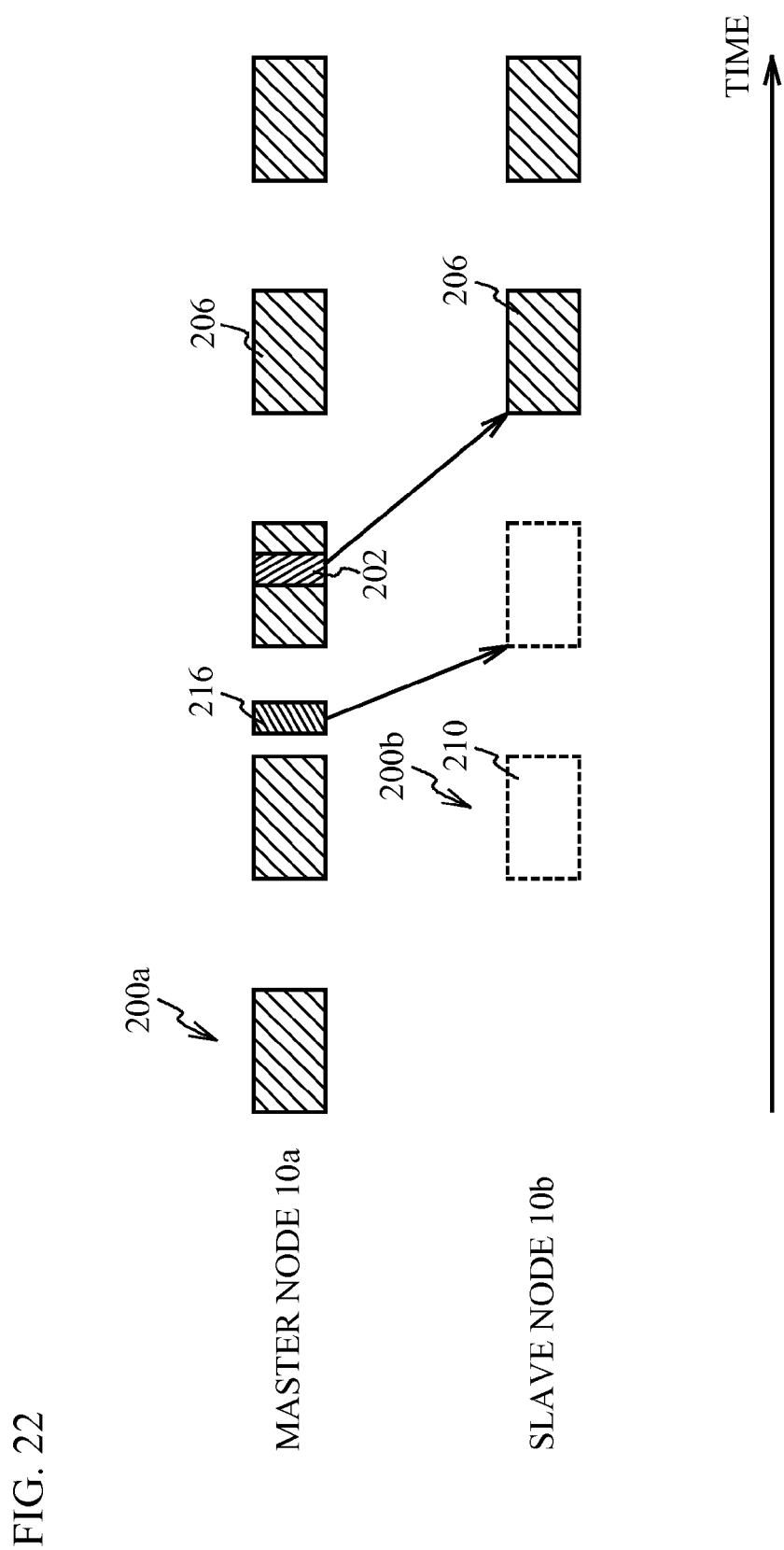
FIG. 22 is a diagram illustrating an example case where a master communication node device switches a slave communication node device from the sleep mode to the relayed communication mode.

FIG. 22 is a diagram showing an example case where the master communication node device 10a changes the slave communication node device 10b from the sleep mode to the relayed communication mode. First, the transmission of notification information of the slave communication node device 10b has been suspended. When a change is made to notification information of the master communication node device 10a, the change extracting unit 60 of the master communication node device 10a extracts the change made to the notification information. The notification information update transmitting unit 61 transmits paging information 216. Accordingly, the slave communication node device 10b can recognize that the notification information of the master communication node device 10a is to be changed. In the next notification information to be transmitted from the master communication node device 10a, the mode information 202 is changed from the sleep mode to the relayed communication mode. In response to that, the communication control unit 99 of the slave communication node device 10b changes the communication mode from the sleep mode to the relayed communication mode. The slave communication node device 10b relays and transmits the notification information 206 of the master communication node device 10a as it is to the mobile terminal 16.

As the master communication node device 10a changes the mode information in notification information in the above manner, the slave communication node device 10b can change communication modes. Also, as the master communication node device 10a transmits paging information, the slave communication node device 10b can recognize that the next notification information is to be changed.

Figure 23:
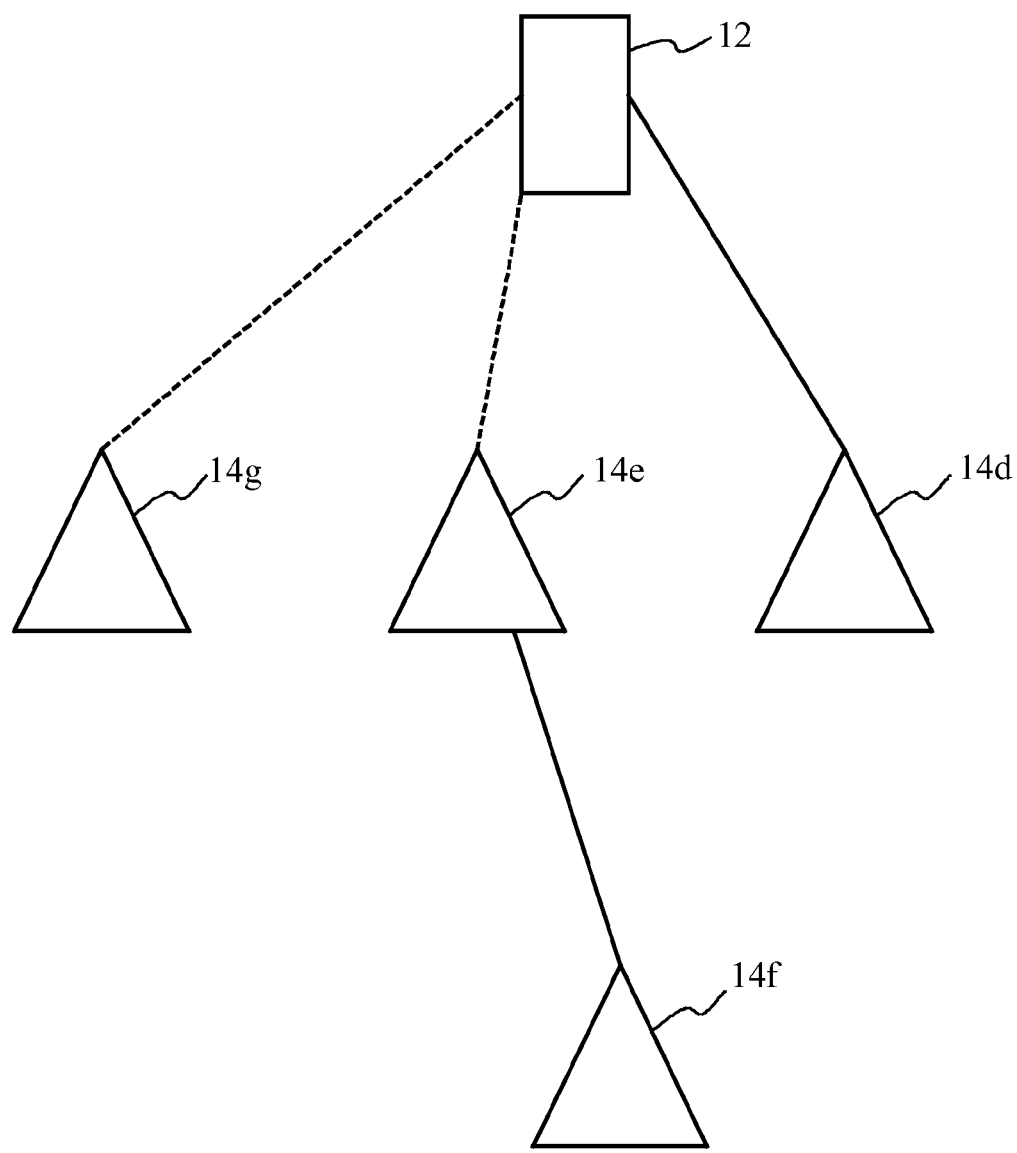
FIG. 23 is a diagram illustrating relationships between a base station and relay stations.

Next, generation of notification information is described. In Embodiment 1, a mobile terminal 16 can be made to recognize surrounding relay stations 14 from notification information. FIG. 23 is a diagram showing the relationships among a base station 12 and relay stations 14. As shown in FIG. 23, there exist relay stations 14d through 14g under the base station 12. In FIG. 23, each solid line indicates a relationship between a master communication node device and a slave communication node device (a master-slave relationship). Each dashed line does not indicate a master-slave relationship but indicates that a relay station is under the base station. The base station 12 is a master communication node device, and the relay station 14d is a slave communication node device in a master-slave relationship with the base station 12. Meanwhile, the relay stations 14e and 14g are under the base station 12 (or in such a relationship as to relay information such as notification information of the base station 12 to mobile terminals), but are not slave communication node devices of the base station 12. Such communication node devices are called independent communication node devices under the base station 12. The relay station 14e and the relay station 14f are in a master-slave relationship. The relay station 14g is not in a master-slave relationship with any relay station.

Figure 24:
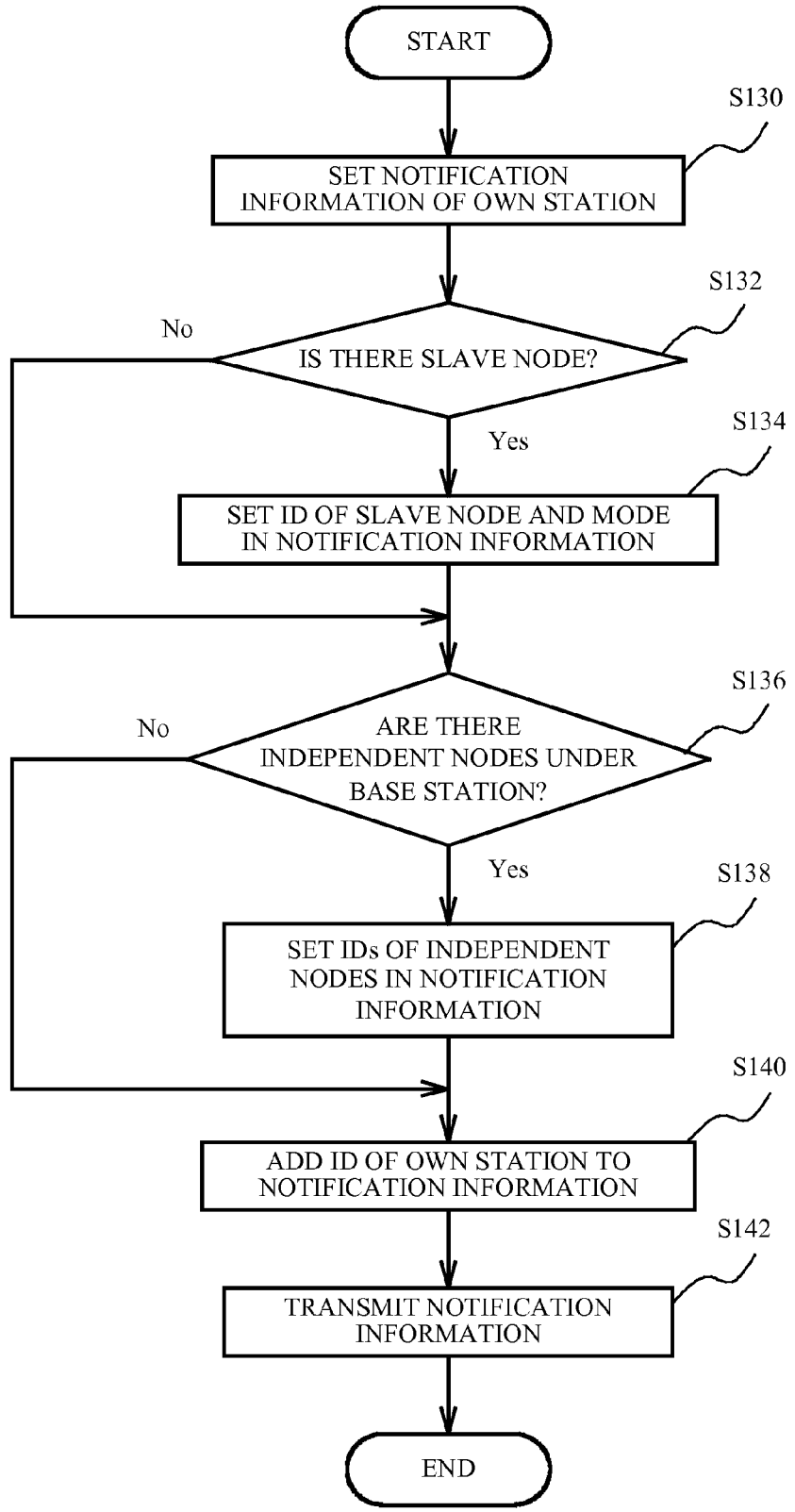
FIG. 24 is a flowchart showing the procedures to be carried out when notification information of a master communication node device is transmitted.

FIG. 24 is a flowchart showing the procedures to be carried out when a master communication node device 10a, which is the base station 12 of FIG. 23, for example, transmits notification information. As shown in FIG. 24, the notification information generating unit 37 of the base station 12 generates notification information of its own station (step S130). The notification information generating unit 37 determines whether there exists a slave communication node device 10b (step S132). If the result indicates "No," the operation moves on to step S136. If the result indicates "Yes," the notification information generating unit 37 sets identification information (ID) of the slave communication node device 10b (the relay station 14d of FIG. 23, for example) and the mode information in the notification information (step S134). The standby station generating unit 36 then determines whether there exist independent communication node devices under the base station 12 (step S136). If the result indicates "No," the operation moves on to step S140. If the result indicates "Yes," the notification information generating unit 37 adds the identification information (ID) of the independent communication node devices (the relay stations 14e and 14g of FIG. 23, for example) to the notification information (step S138). After that, the identification information adding unit 38 sets the identification information of its own station in the notification information (step S140). The transmitting unit 34 transmits the notification information having the identification information added thereto, to a mobile terminal 16 and the slave communication node device 10b (step S142).

Figure 25:
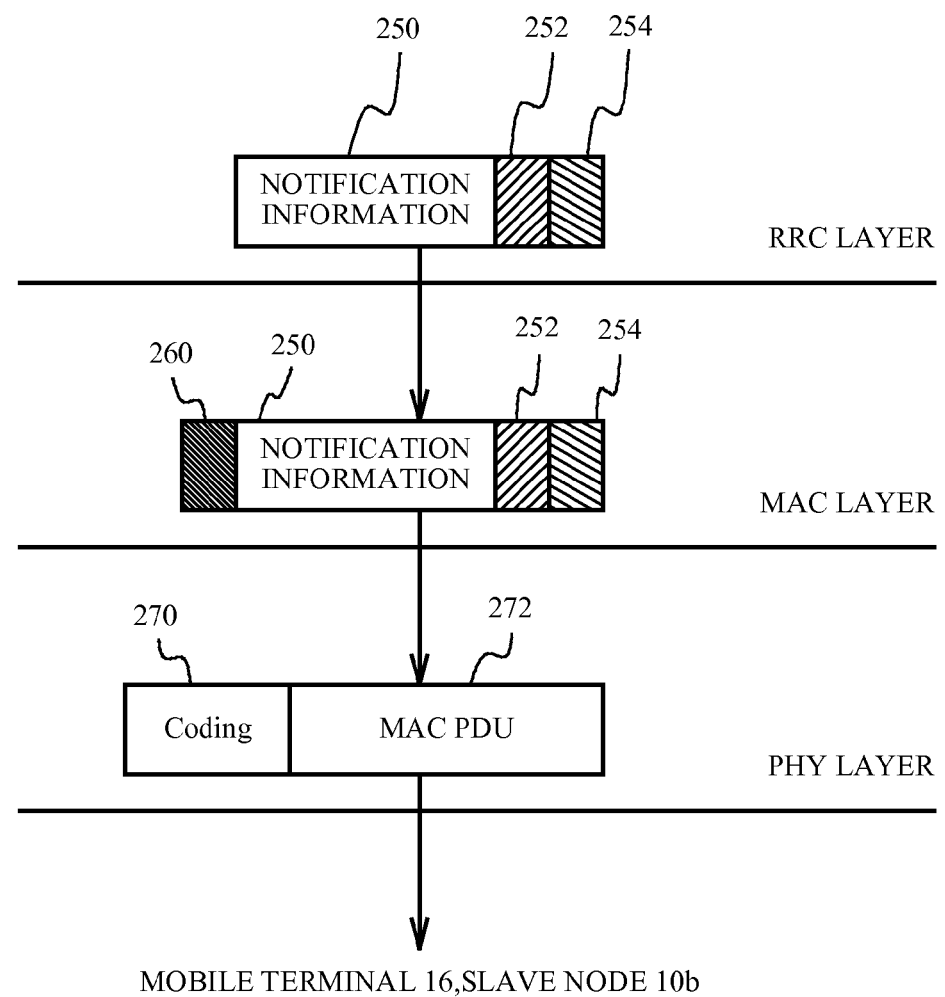
FIG. 25 is a schematic view illustrating a method by which a master communication node device creates notification information.

FIG. 25 is a schematic view illustrating a method by which a master communication node device 10a creates notification information. As shown in FIG. 25, in the RRC (Radio Resource Control) layer, the notification information generating unit 58 sets identification information as information 252 of a slave communication node device 10b and mode information in notification information 250, as in step S134 of FIG. 24. Also, as in step S138, the notification information generating unit 58 sets identification information 254 of the independent communication node devices in the notification information 250. In the MAC (Media Access Control) layer, the identification information adding unit 59 adds the identification information 260 of its own station to the notification information 250, as in step S140 of FIG. 24.

In the PHY (physical) layer, the transmitting unit 54 converts the identification information 260 into "Coding" 270, and the notification information 250 into a MAC PDU 272. The transmitting unit 54 then transmits the converted information to a mobile terminal 16 and the slave communication node device 10*b*.

Figure 26:
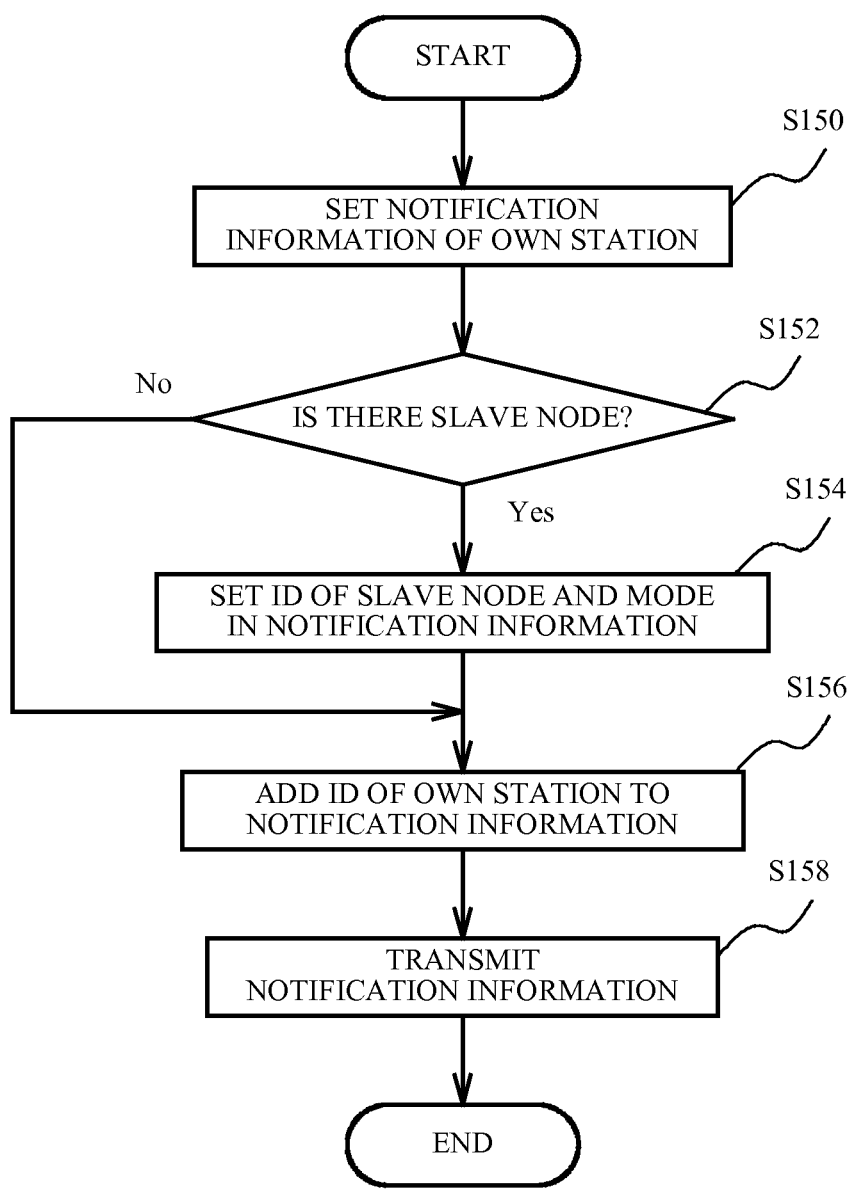
FIG. 26 is a flowchart showing the procedures to be carried out when notification information of an independent communication node device is generated.

FIG. 26 is a flowchart showing the procedures to be carried out when an independent communication node device 10 that is the relay station 14*e* or 14*g* of FIG. 23, for example, generates notification information. As shown in FIG. 26, the notification information generating unit 58 sets notification information of its own station (step S150). The notification information generating unit 58 determines whether there exists a slave communication node device (step S152). If the result indicates "No," the operation moves on to step S156. If the result indicates "Yes," the notification information generating unit 58 sets the identification information of a slave communication node device (the relay station 14*f* of FIG. 23, for example) and the mode information in the notification information (step S154). After that, the identification information adding unit 59 adds the identification information (ID) of its own station to the notification information (step S156). The transmitting unit 54 transmits the notification information having the identification information added thereto, to a mobile terminal 16 and the slave communication node device (step S158).

Figure 27:
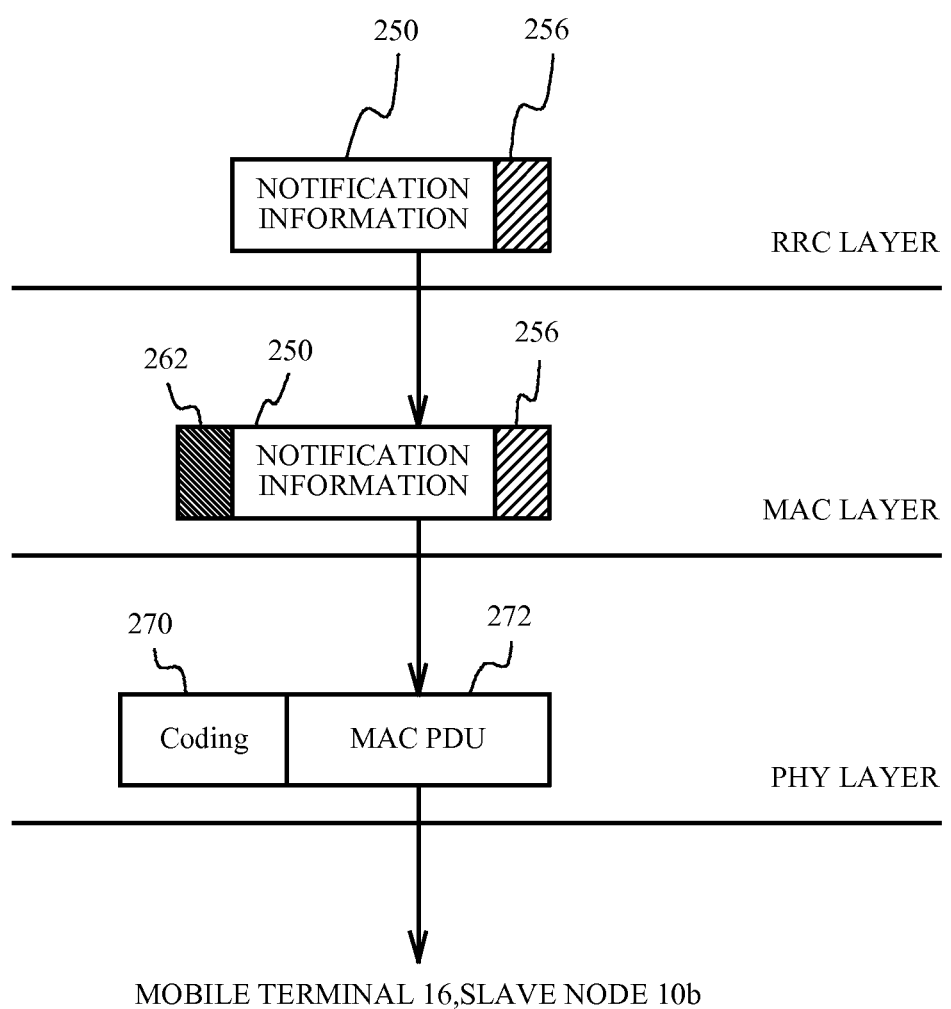
FIG. 27 is a schematic view illustrating a method by which an independent communication node device creates notification information.

FIG. 27 is a schematic view showing a method by which an independent communication node device creates notification information. As shown in FIG. 27, in the RRC layer, the notification information generating unit 58 sets identification information as information 256 of a slave communication node device and the mode information in the notification information 250, as in step S154 of FIG. 26. In the MAC layer, the identification information adding unit 59 adds the identification information 262 of its own station to the notification information 250, as in step S156 of FIG. 26. In the PHY (physical) layer, the transmitting unit 54 converts the identification information 262 into "Coding" 270, and the notification information 250 into a MAC PDU 272. The transmitting unit 54 then transmits the converted information to a mobile terminal 16 and the slave communication node device 10*b*.

Figure 28:
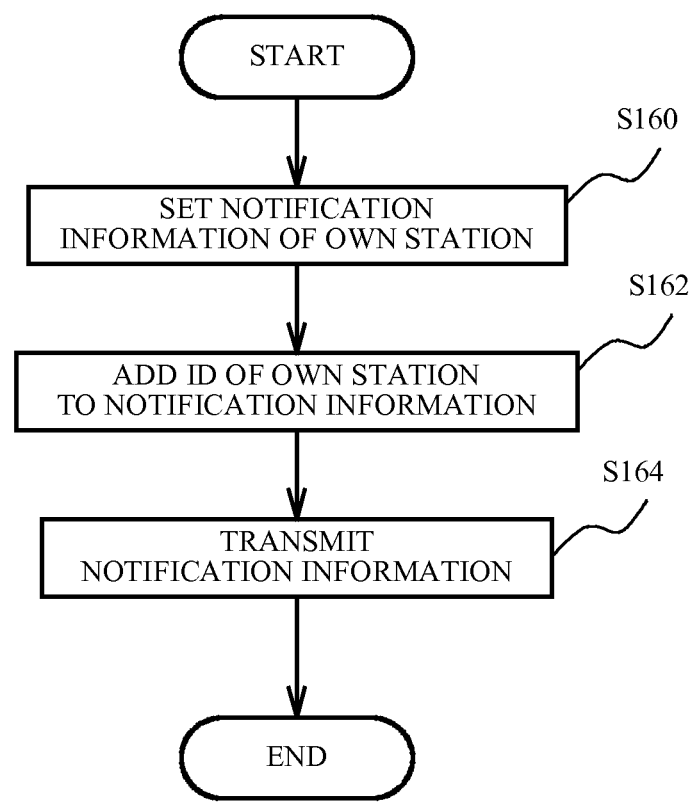
FIG. 28 is a flowchart to be executed when a slave communication node device generates notification information.

FIG. 28 is a flowchart showing the procedures to be carried out when a slave communication node device that is the relay station 14*d* of FIG. 23, for example, generates notification information. As shown in FIG. 28, the notification information generating unit 88 sets notification information of its own station (step S160). The identification information adding unit 89 adds the identification information (ID) of its own station to the notification information (step S162). The transmitting unit 84 transmits the notification information having the identification information added thereto, to a mobile terminal 16 (step S164).

Figure 29:
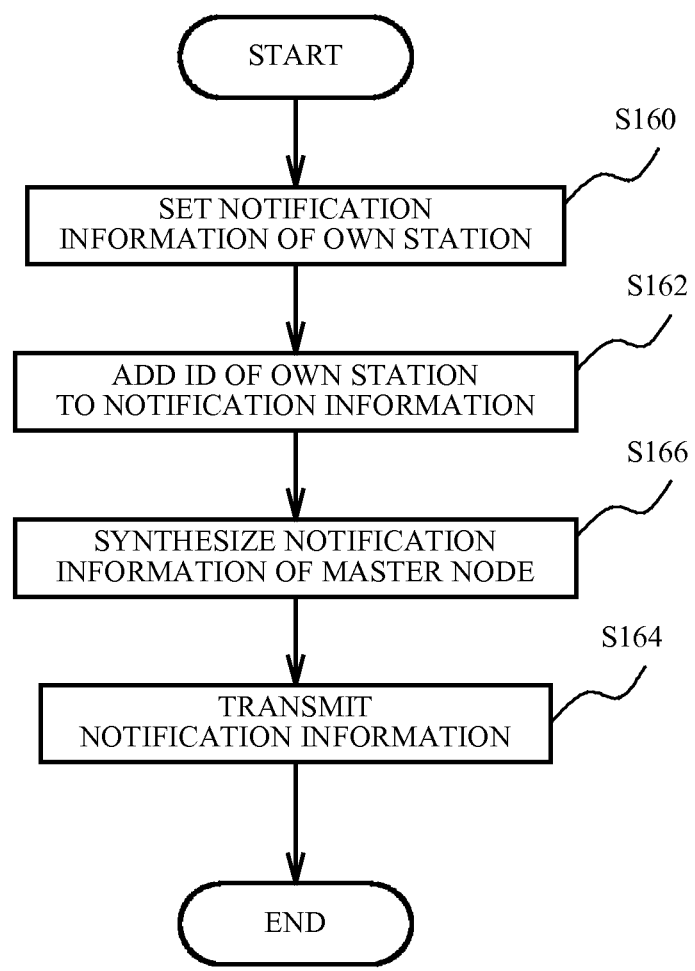
FIG. 29 is a flowchart to be executed when a slave communication node device synthesizes notification information of a master communication node device.

FIG. 29 is a flowchart showing the procedures to be carried out when a slave communication node device 10*b* synthesizes notification information of a master communication node device 10*a*. As shown in FIG. 29, after step S162, the notification information synthesizing unit 90 combines notification information of the master communication node device 10*a* with the notification information of the slave communication node device 10*b* (step S166). The other steps are the same as those of FIG. 28, and therefore, explanation of them is omitted herein.

Figure 30:
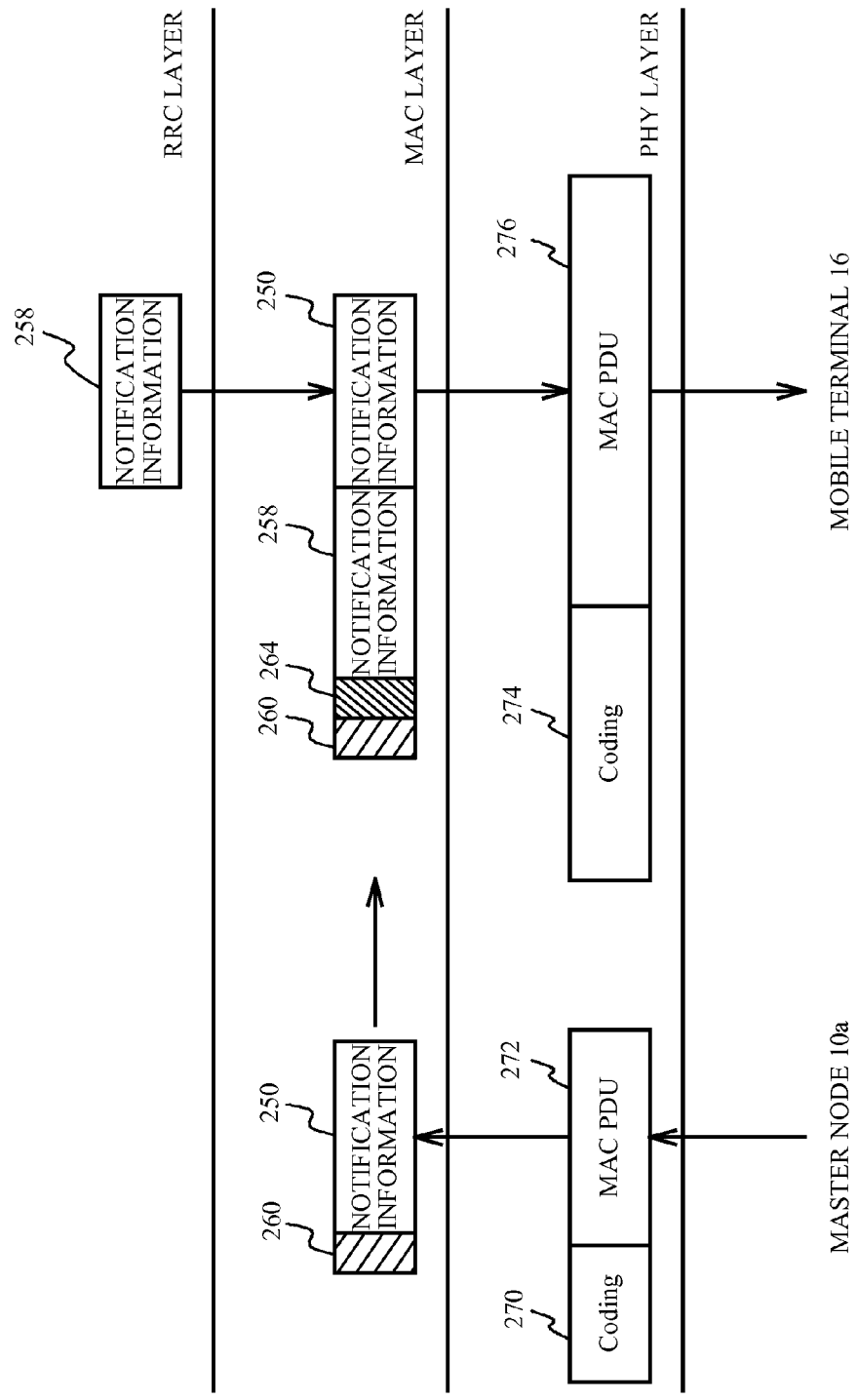
FIG. 30 is a schematic view illustrating a method by which a slave communication node device creates notification information.

FIG. 30 is a schematic view illustrating a method by which a slave communication node device 10*b* creates notification information. As shown in FIG. 30, in the PHY layer, the receiving unit 83 receives "Coding" 270 and a MAC PDU 272 from a master communication node device 10*a*. In the MAC layer, the notification information receiving unit 91 converts the "Coding" 270 and the MAC PDU 272 into identification information 260 and notification information 250 of the master communication node device 10*a*. Meanwhile, in the RRC layer, the notification information generating unit 88 generates notification information 258. In the MAC layer, the identification information adding unit 59 adds the identification information 264 of the slave communication node device 10*b* to the notification information 258. Further, the notification information synthesizing unit 90 combines the notification information 250 of the master communication node device 10*a* with the notification information 258 of the slave communication node device 10*b*. In this manner, the identification information 260 of the master communication node device 10*a* and the identification information 264 of the slave communication node device are combined as identification information. Also, the notification information 250 of the master communication node device 10*a* and the notification information 258 of the slave communication node device are combined. In the PHY layer, the transmitting unit 84 converts the identification information 260 and 264 into "Coding" 274, and the notification information 250 and 258 into a MAC PDU 276, and transmits the converted information to a mobile terminal 16.

Figure 31:
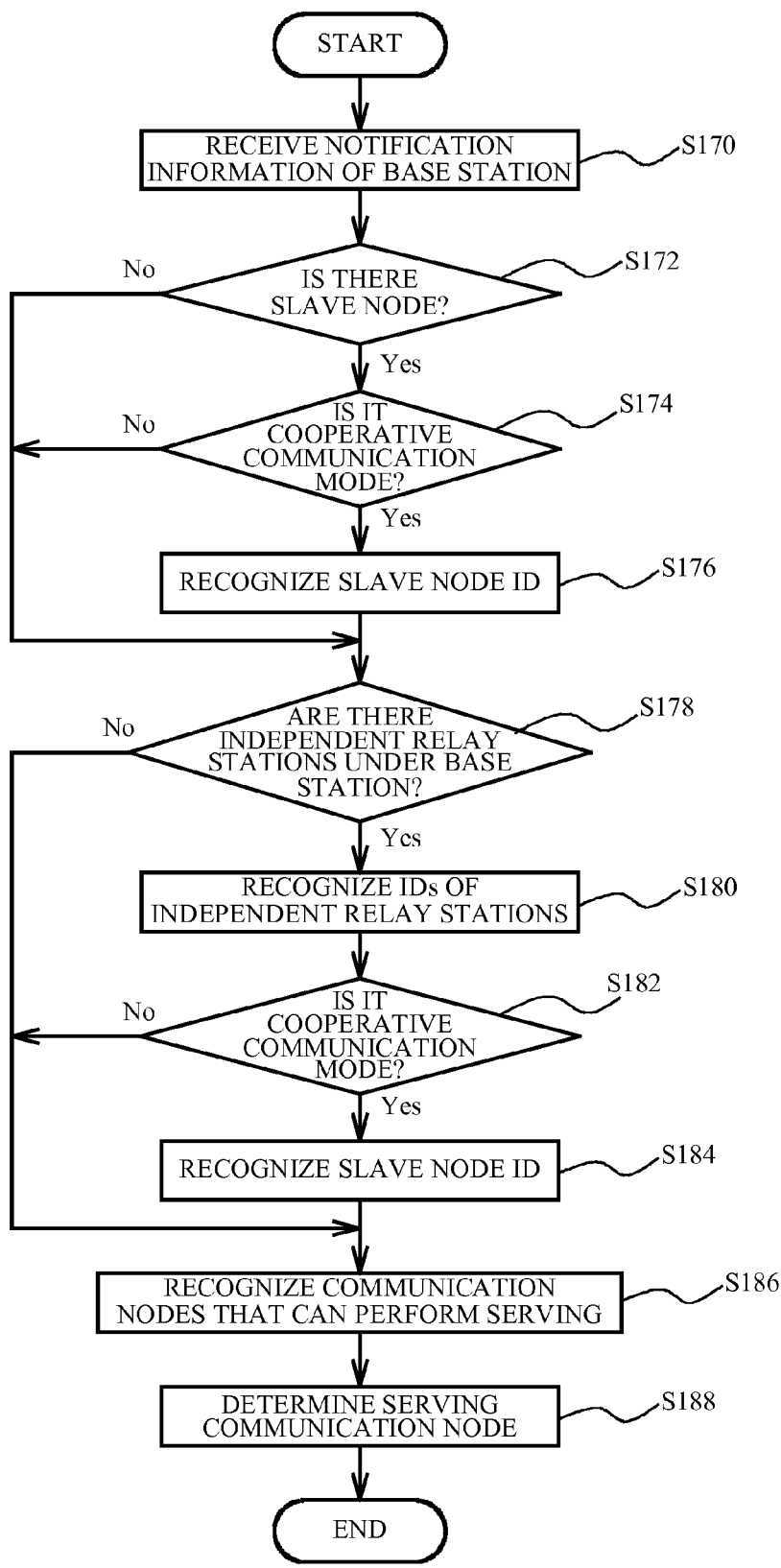
FIG. 31 is a flowchart showing a method by which a mobile terminal receives notification information.

FIG. 31 is a flowchart showing a method by which a mobile terminal 16 receives notification information. The notification information receiving unit 70 of the mobile terminal 16 receives notification information of a base station 12 (the base station of FIG. 12, for example) (step S170). The communication node detecting unit 76 determines whether there exists a slave communication node device (step S172). For example, based on whether the notification information 250 of the base station 12 contains the identification information of a slave communication node device and mode information 252 (see FIG. 25), the communication node detecting unit 76 determines the existence of a slave communication node device (the relay station 14*d* of FIG. 23, for example). If the result of step S172 indicates "No," the operation moves on to step S178. If the result indicates "Yes," the mode information analyzing unit 75 determines whether the communication mode is the cooperative communication mode (step S174). For example, based on the identification information and the mode information 252 shown in FIG. 25, the mode information analyzing unit 75 can determine whether the communication mode is the cooperative communication mode. If the result of step S174 indicates "No," the operation moves on to step S178. If the result indicates "Yes," the communication node detecting unit 76 recognizes the identification information of the slave communication node device (step S176).

After that, the notification information receiving unit 170 determines whether there exist independent relay stations under the base station 12 (step S178). For example, based on whether the notification information 250 of the base station 12 contains the identification information 254 (see FIG. 25) of independent communication node devices, the notification information receiving unit 170 determines whether there exist independent relay stations (the relay stations 14*e* and 14*g* of FIG. 23, for example) under the base station 12. If the result indicates "No," the operation moves on to step S186. If the result indicates "Yes," the communication node detecting unit 76 recognizes the identification information of the independent relay stations (step S180). The mode information analyzing unit 75 determines whether the communication mode is the cooperative communication mode (step 182). If the result indicates "No," the operation moves on to step S186. If the result indicates "Yes," the communication node detecting unit 76 recognizes the identification information of a slave communication node device (the relay station 14f of FIG. 23, for example) of the independent relay stations (step S184).

The standby station receiving unit 77 recognizes communication node devices that can perform serving, such as the base station 12, the slave communication node device (the relay station 14d of FIG. 23, for example) of the base station 12, the independent relay stations (the relay stations 14e and 14g of FIG. 23, for example), and the slave communication node device (the relay station 14f of FIG. 23, for example) of the independent relay stations (step S186). Based on propagation channel measurement, the standby station receiving unit 77 selects a serving communication node device from the above described communication node devices that can perform serving (step S188). The operation then comes to an end.

Figure 32:
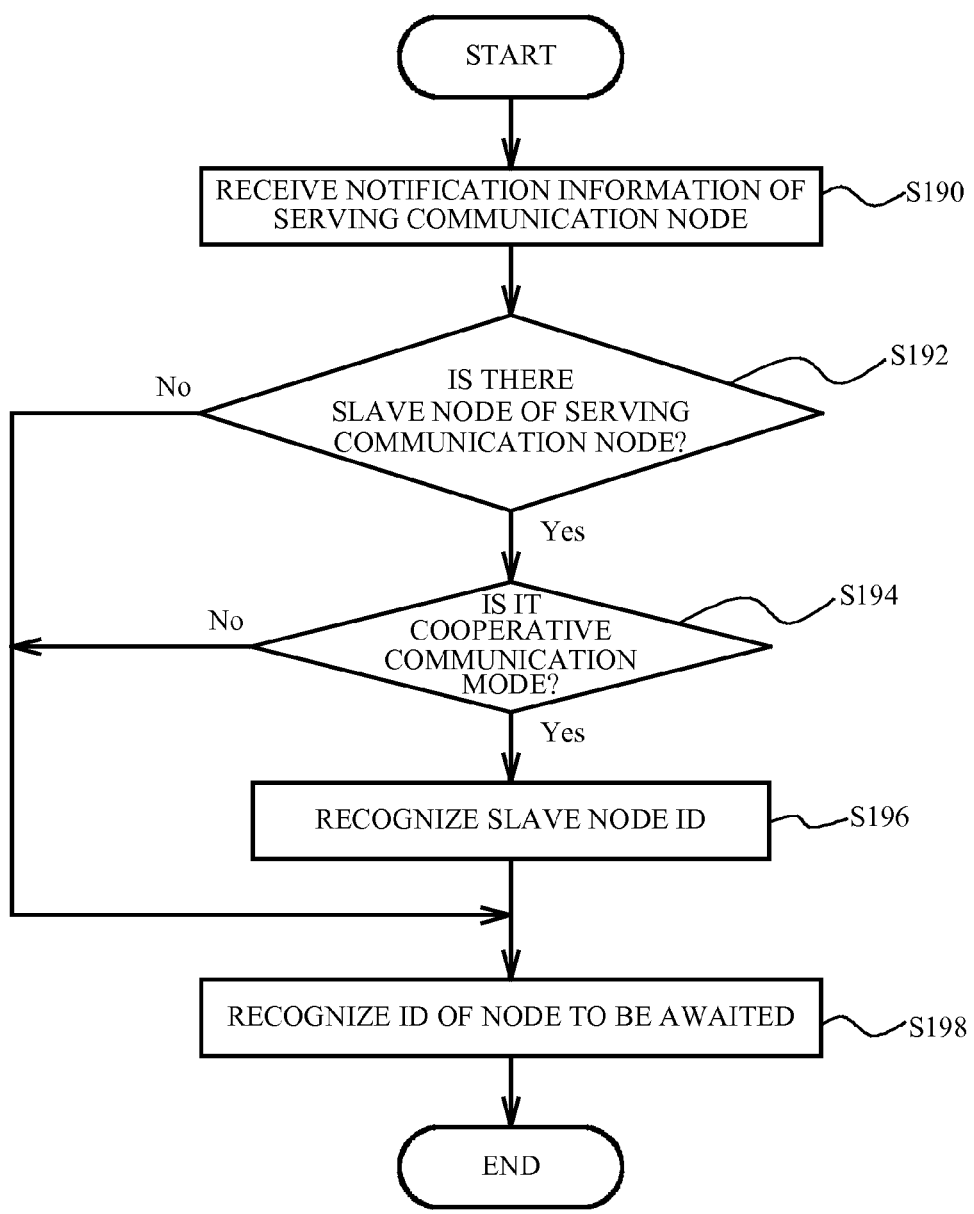
FIG. 32 is a flowchart showing a method by which a mobile terminal recognizes a communication node device to be awaited.

FIG. 32 is a flowchart showing a method by which a mobile terminal 16 recognizes a communication node device to be awaited. As shown in FIG. 32, the notification information receiving unit 70 receives notification information of the communication node device selected as the serving communication node device in step S188 of FIG. 31 (step S190). The communication node detecting unit 76 determines whether there exists a slave communication node device of the serving communication node (step S192). If the result indicates "No," the operation moves on to step S198. If the result indicates "Yes," the mode information analyzing unit 75 determines whether the communication mode is the cooperative communication mode (step S194). If the result indicates "No," the operation moves on to step S198. If the result indicates "Yes," the communication node detecting unit 76 recognizes the identification information of the slave communication node device. In step S198, the standby station receiving unit 77 recognizes the identification information of a communication node device to be awaited (step S198). For example, in a case where the serving communication node device cooperates with a slave communication node device in the cooperative communication mode, the communication node devices to be awaited are the serving communication node device and its slave communication node device. In other cases, on the other hand, the communication node device to be awaited is the serving communication node device.

According to Embodiment 1, as shown in FIG. 13, the cooperation control unit 55 (the mode selecting unit) of a master communication node device 10a selects the cooperative communication mode or the relayed communication mode. As in step S13 of FIG. 9, the mode information generating unit 56 (a mode information transmitting unit) of the master communication node device 10a transmits mode information indicating the selection result of the cooperation control unit 55 to a slave communication node device 10b. Here, the cooperative communication mode is the mode in which the notification information for causing the slave communication node device 10b to perform cooperative communications is transmitted to a mobile terminal 16. The relayed communication mode is the mode in which the slave communication node device 10b is made to relay notification information to the mobile terminal 16.

Also, a slave communication node device 10b of Embodiment 1 has the mode information analyzing unit 93 to receive mode information from a master communication node device 10a, as in step S110 of FIG. 15. Based on the mode information, the notification information generating unit 88 (a notification information transmitting unit) transmits the notification information for cooperative communications with the master communication node device 10a, to a mobile terminal 16, as in step S120. Also, as in step S122, notification information from the master communication node device 10a is relayed to mobile terminal 16.

Further, a mobile terminal 16 of the embodiment has the mode information analyzing unit 75 to receive the mode information indicating whether the communication mode is the cooperative communication mode or the relayed communication mode, as in step S100 of FIG. 16.

Through the above procedures, the cooperation control unit 55 selects the cooperative communication mode or the relayed communication mode, so that the communication area can be suitably widened in a case where the relayed communication mode is selected, and the communication rate can be suitably improved in a case where the cooperative communication mode is selected. Also, the cooperative communication mode and the relayed communication mode are controlled by controlling the notification information to be transmitted by the slave communication node device 10b. Accordingly, the cooperative communication mode and the relayed communication mode can be controlled with a small amount of resource.

Also, in a master communication node device 10a of Embodiment 1, the cooperation control unit 55 (the mode selecting unit) can select the cooperative communication mode, the relayed communication mode, or the sleep mode, as in FIG. 13. Here, the sleep mode can be the mode in which transmission of notification information from a slave communication node device 10b to a mobile terminal 16 is suspended. Accordingly, the slave communication node device 10b can be suspended, and the resource can be saved. Also, the sleep mode is executed by controlling the notification information to be transmitted by the slave communication node device 10b. Accordingly, the resource can be further saved.

Further, as in step S11 of FIG. 9 and FIG. 12, the cooperation control unit 55 of a master communication node device 10a receives priority information as OAM information. In a case where the master communication node device 10a has a higher priority than that of another communication node device 10b ("Yes" in steps S50 and S58 of FIG. 12), the cooperation control unit 55 selects a communication mode as in FIG. 13. In a case where the master communication node device 10a has a lower priority than that of the slave communication node device 10b ("No" in steps S50 and S58 of FIG. 12), the mode selection shown in FIG. 13 is not performed. Here, the priority information indicates the priorities in the master-slave relationships among communication node devices 10 including the master communication node device 10a and the slave communication node device 10b. Accordingly, based on the priority information, the master communication node device 10a and the slave communication node device 10b can be flexibly set.

Further, in a case where the traffic of a master communication node device 10a is higher than the first threshold value th1 as in step S91 of FIG. 13, the cooperation control unit 55 selects the cooperative communication mode as the communication mode as in step S92. Accordingly, when the traffic becomes higher, the communication rate can be improved.

Further, in a case where the traffic of a master communication node device 10a is lower than the second threshold value th2 as in step S91 of FIG. 13, and where the area of a slave communication node device 10b can be covered by the master communication node device 10a as in step S94, the cooperation control unit 55 selects the sleep mode as the communication mode. Accordingly, when the traffic is low, the power consumption by the slave communication node device 10b can be reduced.

Further, according to Embodiment 1, when the communication mode is the cooperative communication mode, the reception information generating unit 79 (an information transmitting unit) of a mobile terminal 16 transmits reception information indicating that the notification information for performing cooperative communications has been received, to a master communication node device 10a, as in step S108 of FIG. 16.

In the master communication node device 10a of Embodiment 1, the reception information receiving unit 62 (an information receiving unit) receives the reception information from the mobile terminal 16, as in step S15 of FIG. 9. As in steps S16 and S17, the cooperation instructing unit 63 instructs a slave communication node device 10b to perform cooperative communication setting.

Through the above procedures, the master communication node device 10a can recognize that the mobile terminal 16 has received notification information from the slave communication node device 10b. Accordingly, it is possible to notify of the cooperative communication setting by the slave communication node device 10b.

Further, as in step S148 of FIG. 17, when a mobile terminal 16 performs a handover, the reception information generating unit 79 of the mobile terminal 16 can transmit the reception information. When the mobile terminal 16 performs a handover, communication node devices with which the mobile terminal 16 is to communicate are switched. Accordingly, the mobile terminal 16 again transmits the reception information, so that the master communication node device 10a can again perform cooperative communication setting.

Further, as in step S134 of FIG. 24 and FIG. 25, the transmitting unit 54 (the mode information transmitting unit) of a master communication node device 10a puts the mode information 252 into the notification information 250 of the master communication node device 10a, and transmits the information to a slave communication node device 10b. Accordingly, the slave communication node device 10b can recognize the communication mode. As the notification information 250 is also transmitted to a mobile terminal 16, the mobile terminal 16 can also recognize the communication mode.

Further, as in step S134 of FIG. 24 and FIG. 25, the transmitting unit 54 (the notification information transmitting unit) of the master communication node device 10a puts the identification information of the slave communication node device 10b into notification information of the master communication node device 10a, and transmits the information to the mobile terminal 16. Accordingly, the mobile terminal 16 can recognize the slave communication node device 10b.

Further, as in step S138 of FIG. 24, the transmitting unit 54 of the master communication node device 10a adds the identification information of subordinate independent communication node devices (communication node devices that are under the master communication node device 10a but do not include the slave communication node device 10b) to notification information of the master communication node device 10a, and transmits the information to the mobile terminal 16. Accordingly, the mobile terminal 16 can recognize the independent communication node devices under the master communication node device. Thus, the mobile terminal 16 can recognize all the communication node devices under the master communication node device, as in FIG. 31. With this arrangement, when serving communication node devices to communicate are switched due to a handover, the mobile terminal 16 can recognize beforehand the communication node device to be awaited.

Further, as in FIGS. 29 and 30, the transmitting unit 84 (the mode information transmitting unit) of a slave communication node device adds notification information of a master communication node device to notification information of the slave communication node device, and transmits the information to a mobile terminal 16. Accordingly, where the communication mode is the cooperative communication mode, the mobile terminal 16 can also receive the notification information of the master communication node device. For example, there are cases where notification information needs to be spread in an entire area such as a wide disaster-warning area. In FIGS. 29 and 30, even if the mobile terminal 16 cannot receive information directly from the master communication node device (such as a base station), the mobile terminal 16 can still receive the notification information of the master communication node device.

In the block diagrams shown in FIGS. 6 and 7, a master communication node device 10a and a slave communication node device 10b are illustrated separately from each other. As in FIG. 12, however, a communication node device 10 can be switched to a master communication node device 10a or a slave communication node device 10b by the cooperation control units 55 and 85. That is, a communication node device 10 can select a mode between a master mode and a slave mode. Here, the master mode is the mode in which the communication node device 10 becomes the master communication node device 10a that controls notification information of other communication node devices. The slave mode is the mode in which the communication node device 10 becomes the slave communication node device 10b that has notification information controlled by another communication node device.

In Embodiment 1, slave communication node device setting is performed in accordance with the above described mode selection, starting from a communication node device that has a high priority and should be the master node among communication node devices, as in steps S40 and S42 of FIG. 12. In a case where the communication node device of its own station has not been set in the slave communication mode at the turn of the communication node device of its own station as in steps S42 and S44, the cooperation control unit 55 (a selecting unit) selects a master node as in step S50. In this manner, a communication node device that has a high priority and should be a master communication node device can be efficiently set as a master communication node device.

Also, in a case where the traffic of the communication node device of its own station is higher than the first threshold value th1, the cooperation control unit 55 selects a master node as in steps S48, S50, and S52 of FIG. 12. A communication node device having a lower priority than that of the communication node device of its own station is then set as a slave communication node device 10b. In this manner, a communication node device with a low priority can be efficiently set as a slave communication node device.

Further, where the communication node device of its own station has been set as the master communication node device, the transmitting unit 54 (the information transmitting unit) can also transmit mode information to the slave communication node device 10b. The mode information is designed for transmitting notification information to a mobile terminal 16, with the notification information being designed for causing the communication node device of its own station and the slave communication node device to perform cooperative communications with the mobile terminal 16.

Embodiment 2

Figure 33:
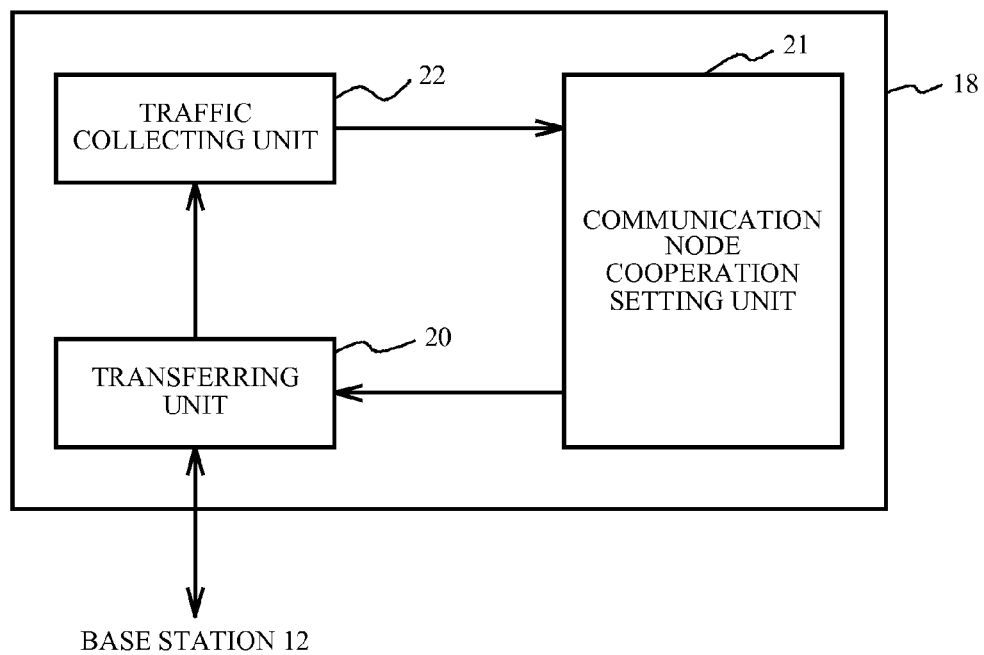
FIG. 33 is a block diagram of an OAM device of Embodiment 2.

Embodiment 2 is an example in which the OAM device 18 performs the master and slave communication node device setting and the communication mode selection illustrated in FIGS. 12 and 13. FIG. 33 is a block diagram of an OAM device of Embodiment 2. As shown in FIG. 33, based on traffic information of respective communication node devices collected by a traffic collecting unit 22, a communication node cooperation setting unit 21 determines the master-slave relationships among the respective communication node devices, and communication modes, in the same manner as in FIGS. 12 and 13.

Figure 34:
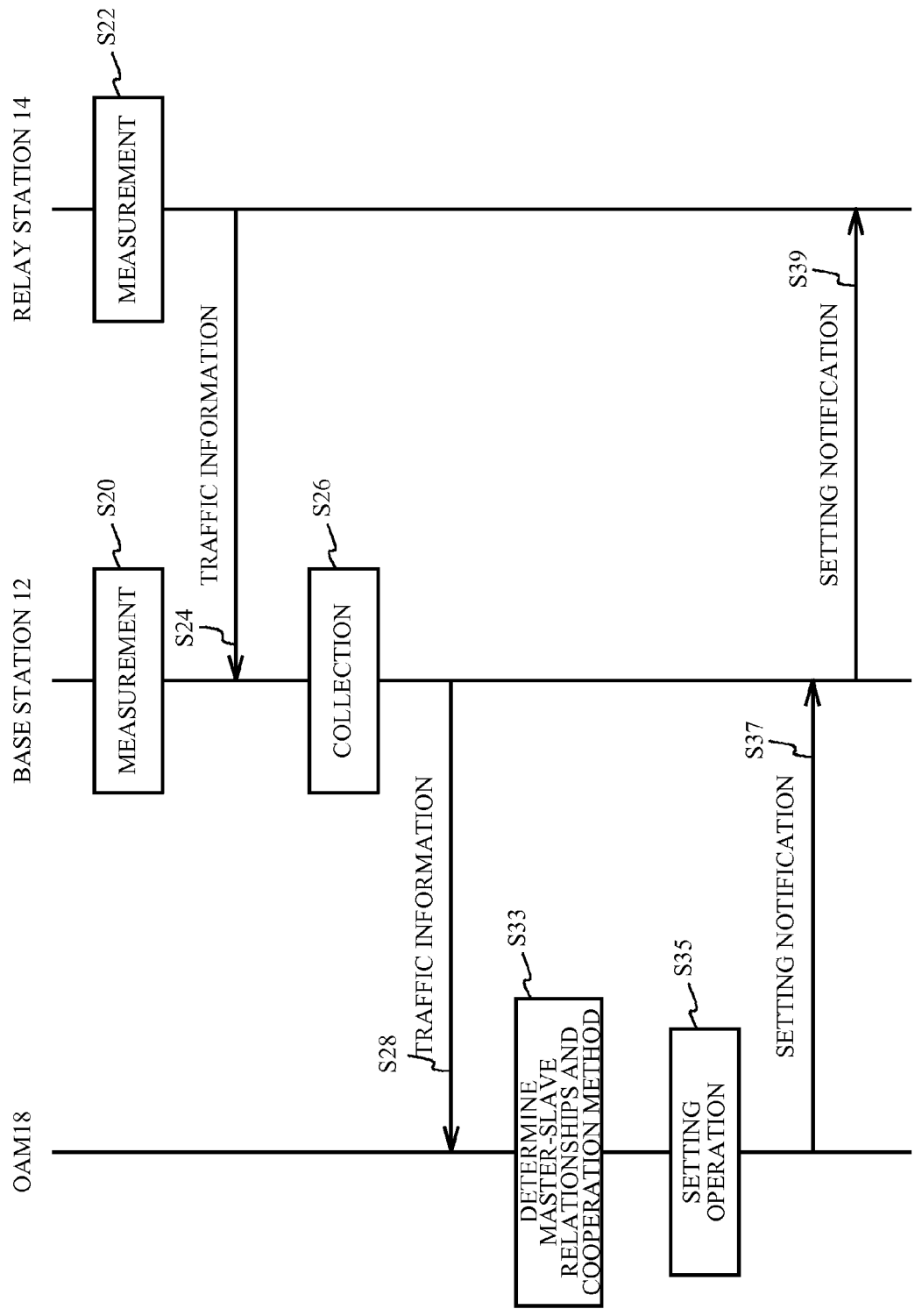
FIG. 34 is a sequence diagram of Embodiment 2.

FIG. 34 is a sequence diagram of the OAM device 18 of Embodiment 2, a base station 12, and a relay station 14. After step S28 of FIG. 11 of Embodiment 1, the communication node cooperation setting unit 21 of the OAM device 18 determines the master-slave relationships among the respective communication node devices, and each communication mode (step S33). The determined master-slave relationships and each communication mode are set (step S35). The OAM device 18 transmits setting information about the settings of the master-slave relationships and each communication mode, to the base station 12 (step S37). The base station 12 transmits the setting information to the relay station (step S39).

Based on the setting information, a master communication node device 10*a* transmits mode information to a slave communication node device 10*b* and a mobile terminal 16. As in Embodiment 2, master-slave relationships and communication modes may be set by the OAM device 18.

Embodiment 3

Figure 35:
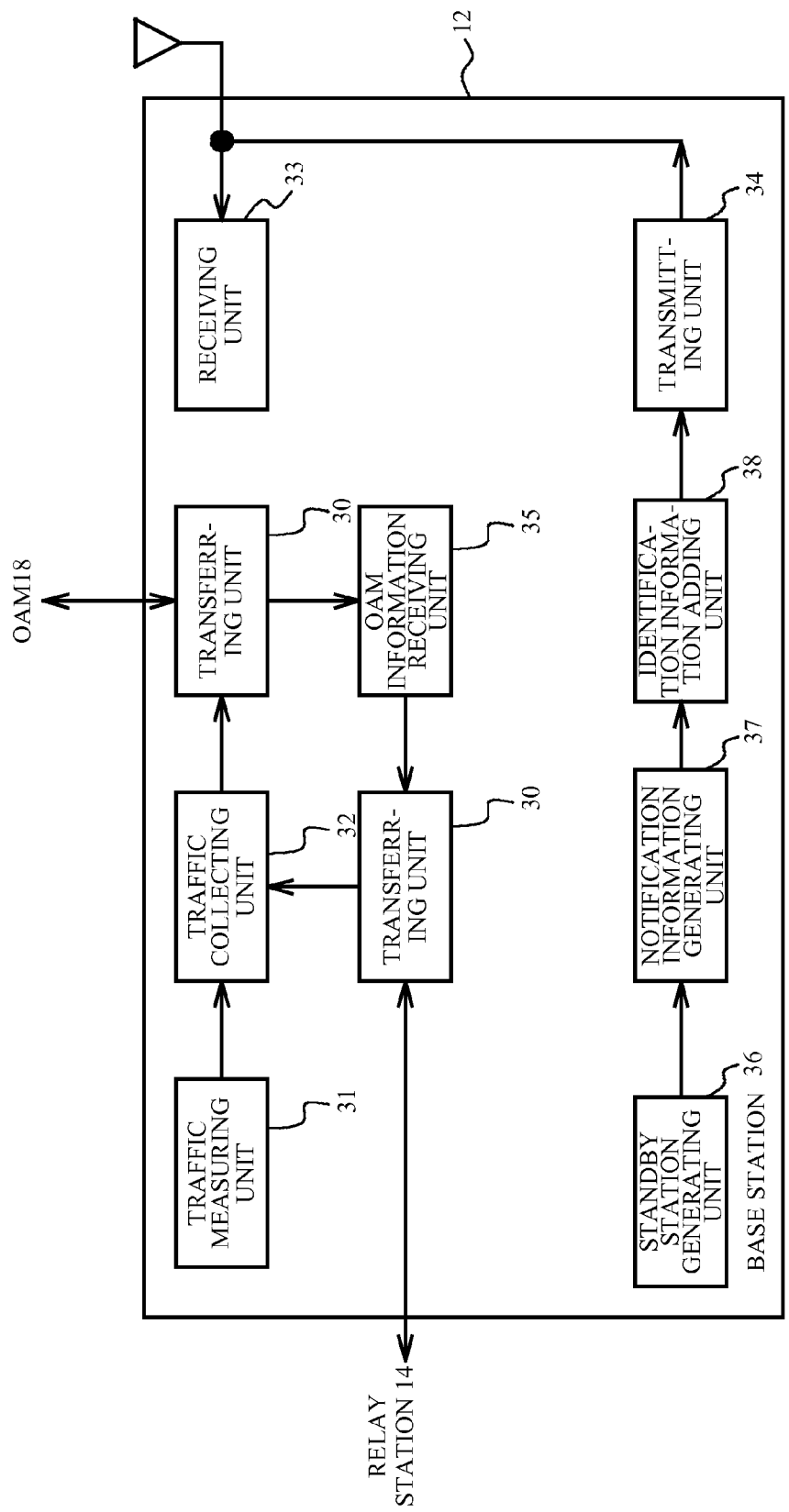
FIG. 35 is a block diagram of a base station of Embodiment 3.

Embodiment 3 is an example in which transmission and reception of traffic information and OAM information between base stations 12 and relay stations 14 through wired transfers or special-purpose wireless transfers. FIG. 35 is a block diagram of a base station 12 of Embodiment 3. OAM information is transferred from an OAM information receiving unit 35 to a relay station 14 via a transferring unit 30. A traffic collecting unit 32 collects traffic information from the relay station 14 via the transferring unit 30. The other aspects of the structure as the same as those of Embodiment 1 illustrated in FIG. 4.

Figure 36:
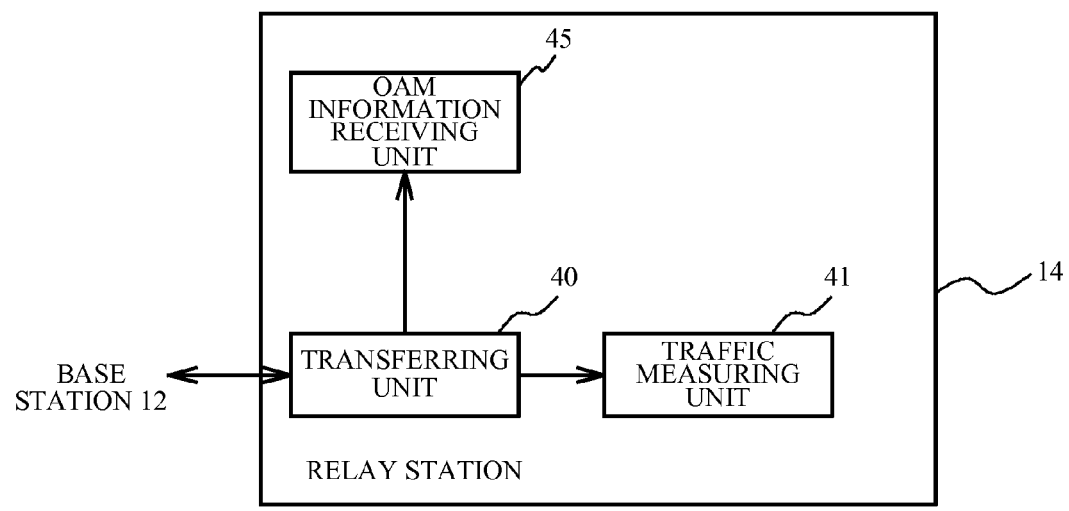
FIG. 36 is a block diagram of a relay station of Embodiment 3.

FIG. 36 is a block diagram of a relay station 14 of Embodiment 3. Traffic information measured by a traffic measuring unit 41 is transferred to a base station 12 via a transferring unit 40. OAM information from the base station 12 is received by an OAM information receiving unit 45 via the transferring unit 40. The other aspects of the structure are the same as those of Embodiment 1 illustrated in FIG. 5, and therefore, explanation of them is omitted herein.

As in Embodiment 3, OAM information and traffic information can be transmitted and received through wired transfers or special-purpose wireless transfers.

Embodiment 4

Figure 37:
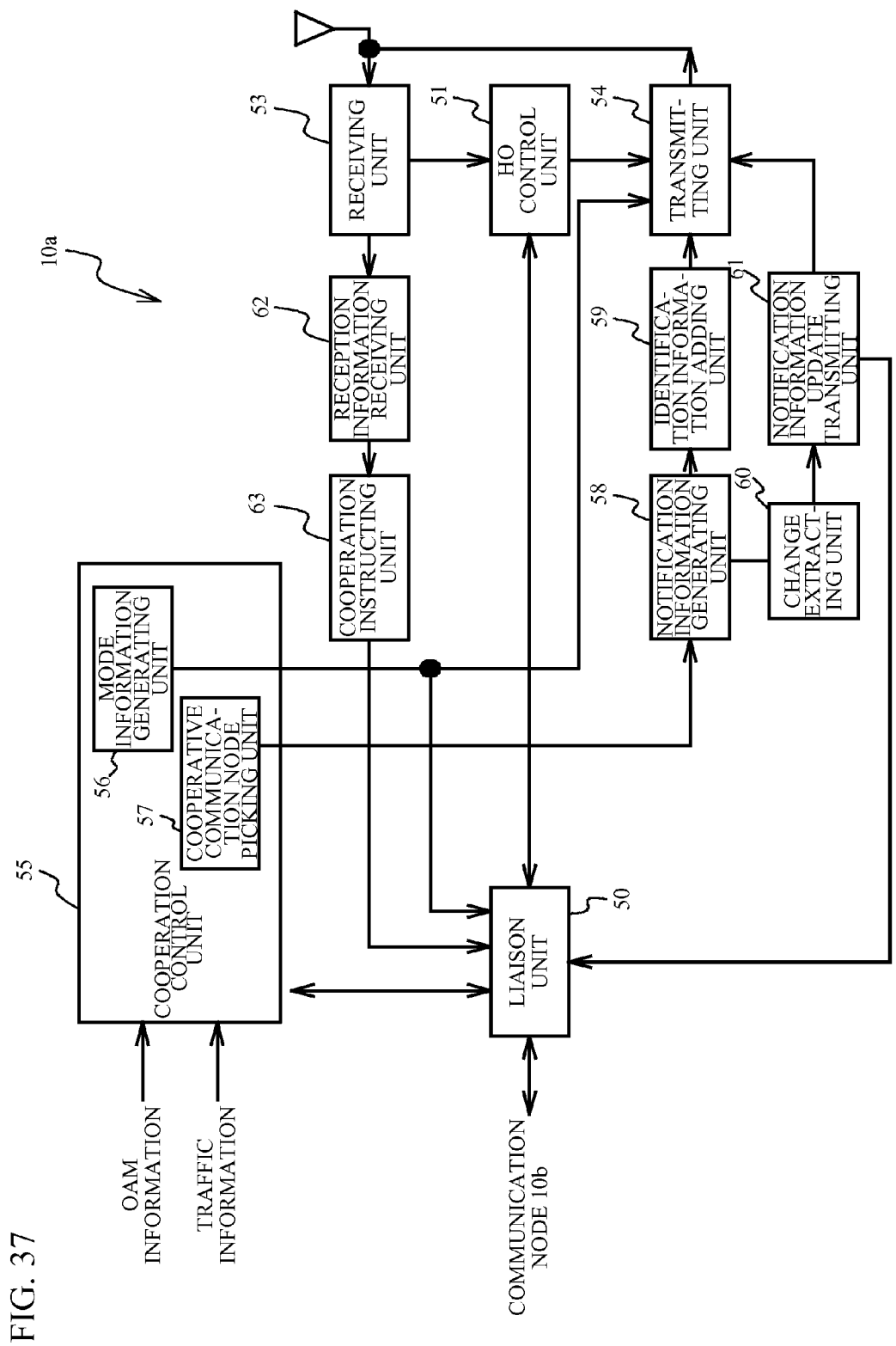
FIG. 37 is a block diagram of a master communication node device of Embodiment 4.
Figure 38:
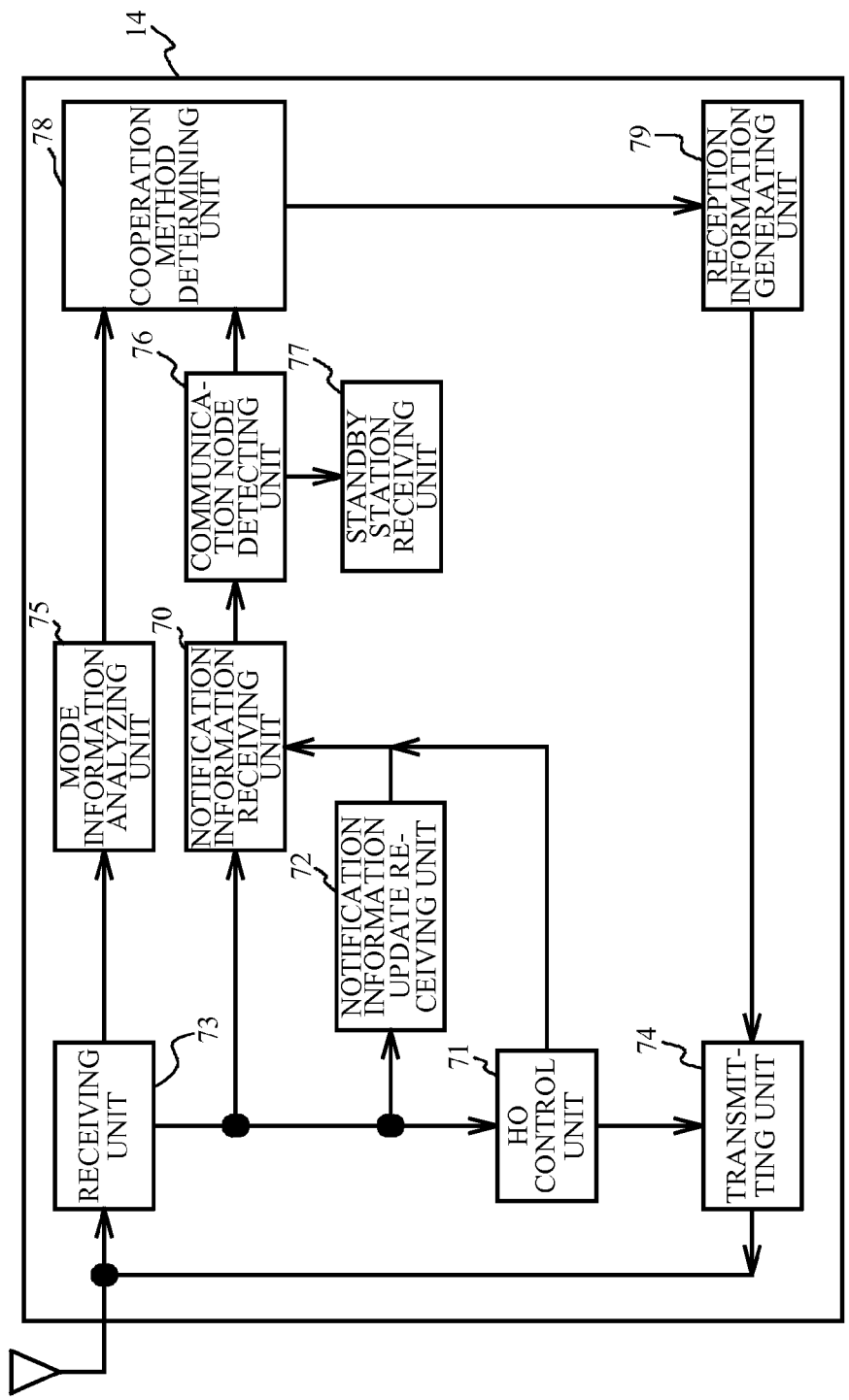
FIG. 38 is a block diagram of a mobile terminal of Embodiment 4.

Embodiment 4 is an example in which mode information is transmitted and received without a notification channel. FIG. 37 is a block diagram of a master communication node device 10*a* of Embodiment 4. Mode information generated by a mode information generating unit 56 is output directly to a transmitting unit 54. The other aspects of the structure are the same as those of Embodiment 1 illustrated in FIG. 6. FIG. 38 is a block diagram of a mobile terminal 16 of Embodiment 4. The mode information is input directly to a mode information analyzing unit 75, without passing through a notification information receiving unit 70. The other aspects of the structure are the same as those of Embodiment 1 illustrated in FIG. 8.

As in Embodiment 4, the mode information may not be included in notification information, and can be directly transmitted and received through wired transfers or wireless transfers.

The wired transmission and reception of information in Embodiments 3 and 4 can also be performed with the use of an X2 interface between base stations or a feeder between a base station and a relay station. Also, the wireless transmission and reception of information may be performed by hopping between communication node devices.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A communication device that is capable of communicating with a mobile terminal in cooperation with another communication device, and is capable of communicating with the mobile terminal via the another communication device, wherein the communication device comprises:

an information transmitting unit configured to put mode information and identification information for identifying the another communication device into first notification information and broadcast the first notification information to the another communication device and one or more mobile terminals including the mobile terminal directly by using a notification channel without specifying a destination;

a mode selecting unit configured to select one of a cooperative communication mode and a relayed communication mode, the cooperative communication mode being for causing the another communication device to broadcast second notification information to the one or more mobile terminals including the mobile terminal directly not through the communication device by using a notification channel without specifying a destination, the second notification information being for causing the mobile terminal to perform a cooperative communication and including specific notification information, wherein the specific notification information is used by the mobile terminal in the cooperative communication and is not included in the first notification information, the relayed communication mode being for causing the another communication device to relay the first notification information received from the communication device and unchanged by the another communication device to the mobile terminal, the mode information indicating the cooperative communication mode or the relayed communication mode;

an information receiving unit configured to receive cooperative capable information from the mobile terminal when the mode selecting unit selects the cooperative communication mode, the cooperative capable information including the identification information indicating another communication device transmitting the second notification information; and a cooperation instructing unit configured to instruct another communication device, which is corresponding to the identification information included in the cooperative capable information, to perform cooperative communication setting, when the information receiving unit receives the cooperative capable information, wherein:

the mobile terminal determines whether the mobile terminal receives the second notification information when the mode information indicates the cooperative communication mode; and the mobile terminal transmits the cooperative capable information to the communication device when the mobile terminal determines that the mobile terminal receives the second notification information and the cooperative communication is available to the mobile terminal.

2. The communication device according to claim 1, wherein the mode selecting unit receives priority information about priorities indicative of master-slave relationships among a plurality of communication devices including the another communication device and the communication device, the mode selecting unit performing mode selection when the priority of the communication device is higher than the priority of the another communication device, the mode selecting unit not performing the mode selection when the priority of the communication device is lower than the priority of the another communication device.

3. The communication device according to claim 2, wherein:

the communication device further comprises a measuring traffic unit configured to measure a traffic of the communication device; and when the traffic of the communication device is higher than a first threshold value, the mode selecting unit selects the cooperative communication mode.

4. The communication device according to claim 3, wherein the mode selecting unit receives priority information about priorities indicative of master-slave relationships among a plurality of communication devices including the another communication device and the communication device, the mode selecting unit selecting the cooperative communication mode when the priority of the another communication device is lower than the priority of the communication device and the traffic of the communication device is higher than the first threshold value, the mode selecting unit not selecting the cooperative communication mode when the priority of the another communication device is not lower than the priority of the communication device and the traffic of the communication device is higher than the first threshold value.

5. The communication device according to claim 1, wherein the mode selecting unit selects one of the cooperative communication mode, the relayed communication mode, and a sleep mode for suspending transmission of notification information from the another communication device to the mobile terminal.

6. The communication device according to claim 5, wherein, when a traffic of the communication device is lower than a second threshold value, and the communication device is capable of covering an area of the another communication device, the mode selecting unit selects the sleep mode.

7. The communication device according to claim 1, wherein the information transmitting unit puts identification information for identifying a communication device that is under the communication device and is not the another communication device into the first notification information.

8. A communication device that is capable of communicating with a mobile terminal in cooperation with another communication device, and is capable of relaying a communication between the another communication device and the mobile terminal, wherein the communication device comprises:

a mode information receiving unit configured to directly receive first notification information broadcast by the another communication device by using a notification channel without specifying a destination, mode information and identification information for identifying the communication device being put into the first notification information by the another communication device; and a notification information transmitting unit configured to broadcast second notification information for performing a cooperative communication with the another communication device to one or more mobile terminals including the mobile terminal directly not through the another communication device by using a notification channel without specifying a destination when the mode information indicates a cooperative communication mode, the second notification information including specific notification information, wherein the specific notification information is used by the mobile terminal in the cooperative communication and is not included in the first notification information, and to relay the first notification information received from the another communication device and unchanged by the another communication device to the mobile terminal when the mode information indicates a relayed communication mode;

wherein:

the mobile terminal determines whether the mobile terminal receives the second notification information when the mode information indicates the cooperative communication mode;

the mobile terminal transmits cooperative capable information to the another communication device when the mobile terminal determines that the mobile terminal receives the second notification information and the cooperative communication is available to the mobile terminal, the cooperative capable information including the identification information indicating communication device transmitting the second notification information;

the another communication device receives the cooperative capable information from the mobile terminal when the mode information indicates the cooperative communication mode; and the another communication device instructs communication device, which is corresponding to the identification information included in the cooperative capable information, to perform cooperative communication setting, when the another communication device receives the cooperative capable information.

9. The communication device according to claim 8, wherein, when transmitting the second notification information, the notification information transmitting unit adds the specific notification information to the first notification information from the another communication device as the second notification information.

10. The communication device according to claim 8, wherein, when the second notification information is updated, the notification information transmitting unit transmits notification information update information to the mobile terminal.

11. A mobile terminal with which a communication device and another communication device are capable of communicating in cooperation with each other, and the communication device is capable of communicating via the another communication device,
wherein the mobile terminal comprises
a receiving unit configured to directly receive first notification information including mode information and identification information for identifying the another communication device and being broadcast by the communication device by using a notification channel without specifying a destination, to directly receive second notification information not through the communication device by using the notification channel without specifying a destination including specific notification information, wherein the specific notification information is used by the mobile terminal in the cooperative communication and is not included in the first notification information, and being broadcast by the another communication device and to perform a cooperative communication to the communication device and the another communication device when the mode information indicates a cooperative communication mode, and to directly receive the first notification information unchanged by the another communication device broadcast by the another communication device and to perform a relayed communication to the communication device through the another communication device when the mode information indicates a relayed communication mode;
a determining unit configured to determine whether the receiving unit receives the second notification information when the mode information indicates the cooperative communication mode; and
a transmitting unit configured to transmit cooperative capable information to the communication device when the determining unit determines that the receiving unit receives the second notification information and the cooperative communication is available to the mobile terminal, the cooperative capable information including the identification information indicating another communication device transmitting the second notification information,
wherein
the communication device receives the cooperative capable information from the mobile terminal when the mode information indicates the cooperative communication mode; and
the communication device instructs another communication device, which is corresponding to the identification information included in the cooperative capable information, to perform cooperative communication setting, when the communication device receives the cooperative capable information.

12. The mobile terminal according to claim 11, wherein, when the mobile terminal performs a handover, the mode information indicates the cooperative communication mode, and the second notification information is received from the another communication device, the information transmitting unit transmits the cooperative capable information to the communication device.

13. A communication system in which a communication device and another communication device are capable of communicating with a mobile terminal in cooperation with each other, and the communication device is capable of communicating with the mobile terminal via the another communication device,
wherein the communication device comprises:
an information transmitting unit configured to put mode information and identification information for identifying the another communication device into first notification information and broadcast the first notification information to the another communication device and one or more mobile terminals including the mobile terminal directly by using a notification channel without specifying a destination;
a mode selecting unit configured to select one of a cooperative communication mode and a relayed communication mode, the cooperative communication mode being for causing the another communication device to broadcast second notification information to the one or more mobile terminals including the mobile terminal directly not through the communication device by using a notification channel without specifying a destination, the second notification information being for causing the mobile terminal to perform a cooperative communication and including specific notification information, wherein the specific notification information is used by the mobile terminal in the cooperative communication and is not included in the first notification information, the relayed communication mode being for causing the another communication device to relay first notification information received from the communication device unchanged by the another communication device to the mobile terminal, the mode information indicating the cooperative communication mode or the relayed communication mode;
an information receiving unit configured to receive cooperative capable information from the mobile terminal when the mode selecting unit selects the cooperative communication mode, the cooperative capable information including the identification information indicating another communication device transmitting the second notification information; and
a cooperation instructing unit configured to instruct another communication device, which is corresponding to the identification information included in the cooperative capable information, to perform cooperative communication setting, when the information receiving unit receives the cooperative capable information,
wherein the mobile terminal comprising:
a determining unit configured to determine whether the information receiving unit receives the second notification information when the mode information indicates the cooperative communication mode; and
a transmitting unit configured to transmit the cooperative capable information to the communication device when determining unit determines that the information receiving unit receives the second notification information and the cooperative communication is available to the mobile terminal.

* * * * *